(12) United States Patent
Ichikawa

(10) Patent No.: US 8,159,708 B2
(45) Date of Patent: Apr. 17, 2012

(54) APPARATUS FOR ACCELERATED PROCESSING OF PRINT DATA BY MAXIMIZING WORD-BOUNDARY ACCESSES OF IMAGE DATA

(75) Inventor: Mikiya Ichikawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1390 days.

(21) Appl. No.: 11/796,300

(22) Filed: Apr. 27, 2007

(65) Prior Publication Data

US 2007/0279420 A1    Dec. 6, 2007

(30) Foreign Application Priority Data

Jun. 1, 2006  (JP) ................................ 2006-153891
Jan. 19, 2007 (JP) ................................ 2007-010736

(51) Int. Cl.
*G06K 15/00* (2006.01)

(52) U.S. Cl. ...... 358/1.16; 345/522; 345/658; 358/1.13; 358/1.17; 382/296; 382/297; 710/35; 710/201

(58) Field of Classification Search ................ 358/1.16; 345/522, 658; 382/296, 297; 710/35, 201
See application file for complete search history.

(56) References Cited

U.S. PATENT DOCUMENTS

| | | | | |
|---|---|---|---|---|
| 4,703,515 A | * | 10/1987 | Baroody, Jr. | ................... 382/297 |
| 4,947,344 A | * | 8/1990 | Hayashi et al. | ............... 345/658 |
| 5,297,217 A | * | 3/1994 | Hamilton et al. | ............. 382/296 |
| 5,717,845 A | * | 2/1998 | Patrick et al. | .................. 345/676 |
| 5,945,997 A | * | 8/1999 | Zhao et al. | ..................... 345/581 |
| 6,473,814 B1 | * | 10/2002 | Lyons et al. | ..................... 710/35 |
| 7,308,608 B1 | * | 12/2007 | Pleis et al. | ....................... 714/30 |
| 2004/0027617 A1 | * | 2/2004 | Ishihara | ....................... 358/3.13 |
| 2005/0015549 A1 | * | 1/2005 | Dierks et al. | .................. 711/118 |
| 2005/0200878 A1 | * | 9/2005 | Nakazato | ..................... 358/1.13 |
| 2007/0064255 A1 | | 3/2007 | Ichikawa | |

FOREIGN PATENT DOCUMENTS

| | | | |
|---|---|---|---|
| JP | 2003039748 A | * | 2/2003 |
| JP | 2003-248834 | | 9/2003 |
| JP | 2004-164549 | | 6/2004 |

* cited by examiner

*Primary Examiner* — King Poon
*Assistant Examiner* — David S Cammack
(74) *Attorney, Agent, or Firm* — Cooper & Dunham LLP

(57) ABSTRACT

A graphic-drawing processing unit performs a rendering process of print data with respect to a band memory or a page memory. When there is a rendering engine that performs a memory access using a memory word width as a minimum unit as a rendering environment, an arbitrary-word-width drawing unit is configured to access an arbitrary-word-width having an arbitrary height, and a one-word width-limited drawing unit is configured to access a limited one-word width having an arbitrary height. The graphic-drawing processing unit performs a drawing process by switching the arbitrary-word-width drawing unit and the one-word-width-limited drawing unit as appropriate.

8 Claims, 22 Drawing Sheets

APPARATUS FOR ACCELERATED PROCESSING OF PRINT DATA BY MAXIMIZING WORD-BOUNDARY ACCESSES OF IMAGE DATA

CROSS-REFERENCE TO RELATED APPLICATIONS

The present document incorporates by reference the entire contents of Japanese priority documents, 2006-153891 filed in Japan on Jun. 1, 2006 and 2007-010736 filed in Japan on Jan. 19, 2007.

BACKGROUND

1. Technical Field

This disclosure relates to a technology for performing a drawing process for print data created at a personal computer (PC) and the like.

2. Description of the Related Art

An image output apparatus is disclosed in Japanese Patent Application Laid-Open No. 2003-248834, which enables an access to a memory at a high speed in units of word, so that a processing speed can be increased for performing a drawing process to a page memory when an arbitrary rectangular mask pattern is used.

Furthermore, Japanese Patent Application Laid-Open No. 2004-164549 discloses an image processing apparatus that fills a bitmap pattern corresponding to a density in a specified drawing range in a tiled manner based on a graphic drawing command, so that a drawing processing time can be decreased and a processing speed can be increased upon receiving an input of the graphic drawing command for an image having a moderate tone variation, such as a photograph.

With the technology disclosed in the Japanese Patent Application Laid-Open No. 2003-248834, when performing the drawing operation using an input mask pattern, it is possible to reduce a memory access and increase the processing speed, because a shift operation can be removed by repeatedly referring to a single word or a plurality of words in units of word. However, because a mask pattern width is uniformly set to either one-word width or a several-word width, there is a problem that a processing time may be increased for a drawing depending on a state of a rectangular drawing or an image drawing, upon performing a rendering process of print data.

Furthermore, with the technology disclosed in the Japanese Patent Application Laid-Open No. 2004-164549, the drawing process is performed in which the bitmap pattern corresponding to a density is filled in the specified drawing range in a tiled manner based on the graphic drawing command for spreading a specified density in a graphic drawing range on a specified page memory. Accordingly, it is possible to decrease the drawing processing time upon receiving the graphic drawing command to the image having the moderate tone variation and to increase the processing speed. However, when a data drawing process includes an image rotation process, the above technologies are not suitable for increasing the processing speed of the data drawing process.

BRIEF SUMMARY

In an aspect of this disclosure, there is provided an apparatus for processing print data that includes a graphic-drawing processing unit that performs a rendering process of print data with respect to either one of a band memory and a page memory; an arbitrary-word-width drawing unit configured to access an arbitrary-word-width having an arbitrary height, when there is a rendering engine that performs a memory access using a memory word width as a minimum unit as a rendering environment of the graphic-drawing processing unit; and a one-word width-limited drawing unit configured to access a limited one-word width having an arbitrary height, when there is the rendering engine as the rendering environment of the graphic-drawing processing unit. The graphic-drawing processing unit performs a drawing process by switching the arbitrary-word-width drawing unit and the one-word-width-limited drawing unit as appropriate.

In another aspect, there is provided an apparatus for processing print data that includes a graphic-drawing processing unit that performs a rendering process of print data with respect to either one of a band memory and a page memory; and an image processing unit that performs either one of a rotation process for rotating image data and a separation process for separating the image data into a plurality images. When drawing an image by performing a page rotation, the image processing unit performs the rotation process after performing the separation process.

In another aspect, there is provided an apparatus for processing print data that includes a graphic-drawing processing unit that performs a rendering process of print data with respect to either one of a band memory and a page memory; an image processing unit that performs either one of a rotation process for rotating image data and a separation process for separating the image data into to a plurality of images; and a size-determination processing unit that determines whether a first size of the image data corresponds to a second size of image data acquired based on an environment. When the size-determination processing unit determines that the first size corresponds to the second size before the graphic-drawing processing unit performs the rendering process, the image processing unit separates the image data into a plurality of images and performs the rotation process.

The aforementioned and other aspects, features, advantages and technical and industrial significance will be better understood by reading the following detailed description of presently preferred embodiments, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited by the embodiments.

Figure 1:
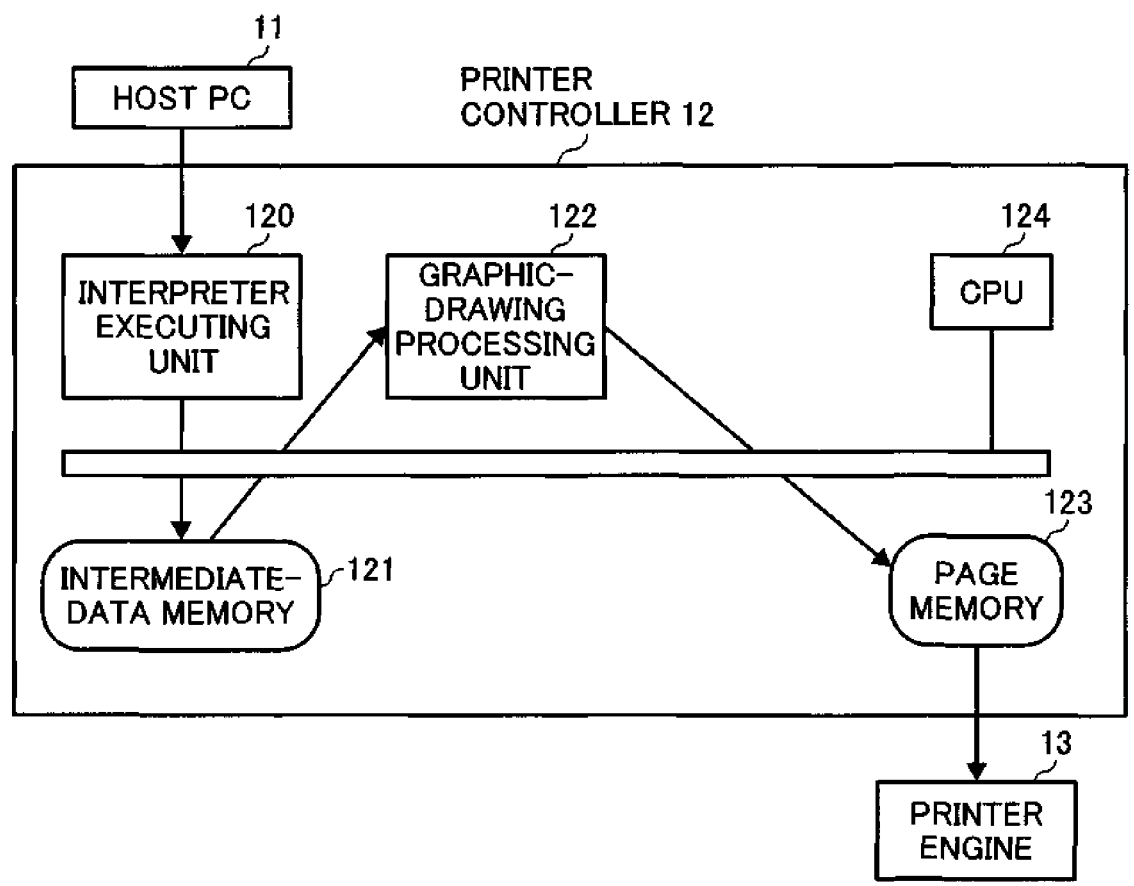
FIG. 1 is a block diagram of a printer controller as a print-data processing apparatus according to a first embodiment of the present invention.

FIG. 1 is a block diagram of a printer controller 12 as a print-data processing apparatus according to a first embodiment of the present invention. In the printer controller 12, an interpreter executing unit 120 receives print data transmitted from a host personal computer (PC) 11 and stores the print data in an intermediate-data memory 121. The intermediate-data memory 121 transmits the print data to a graphic-drawing processing unit 122 and a drawing is performed to a page memory 123. A printer engine 13 that actually performs a printing refers to a drawing result in the page memory 123 and performs a printing on a sheet paper. The printer controller 12 also includes a central processing unit (CPU) 124.

In this manner, upon drawing an image by a printer, the print data is transmitted as a group of drawing commands from the host PC 11 to the printer controller 12. The drawing commands include various types of commands, such as a text, a graphic, or an image, and each of which has unique characteristic.

Figure 2:
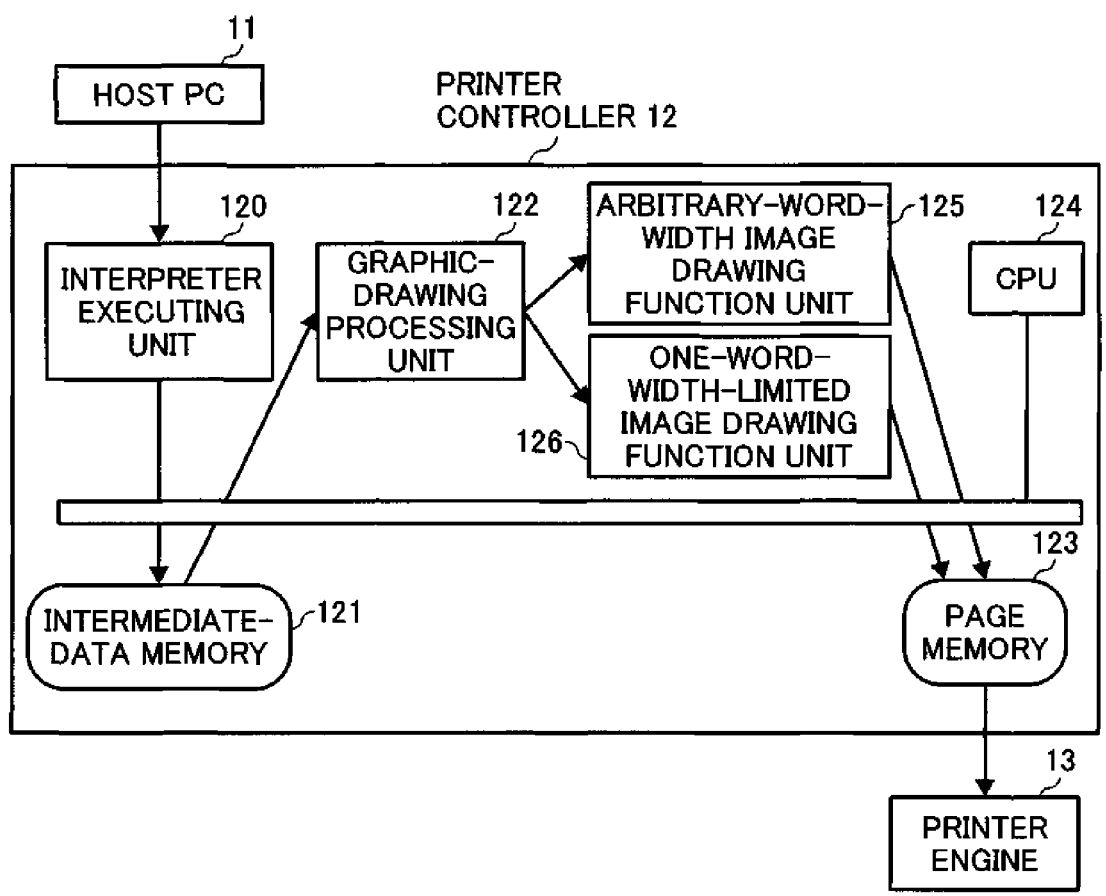
FIG. 2 is a block diagram of the printer controller shown in FIG. 1.

FIG. 2 is a block diagram of the printer controller 12 according to the first embodiment. Upon drawing an image, a drawing process is performed in which image data is pasted to the page memory 123 using an image drawing command as the print data. The image data is specified in a rectangular drawing region constituted of information about coordinates of a drawing start point and a width and a height of the image. In this case, it is possible to improve processing efficiency and to increase a drawing process speed by accessing the page memory 123 in units of memory word length. If a specified drawing range does not correspond to a memory word boundary, both lateral sides of the drawing range are masked as appropriate, so that a drawing to an unnecessary region can be prevented.

The printer controller 12 according to the first embodiment is constituted so that the graphic-drawing processing unit 122 performs a graphic drawing process and includes an arbitrary-word-width image drawing function unit 125 and a one-word-width-limited image drawing function unit 126, which are selectively used as appropriate. The arbitrary-word-width image drawing function unit 125 makes it possible to draw an image with an arbitrary-word-width while the one-word-width-limited image drawing function unit 126 makes it possible to exclusively draw an image with equal to or smaller than one-word width. Accordingly, it is possible to switch a use of the arbitrary-word-width image drawing function unit 125 and the one-word-width-limited image drawing function unit 126 based on whether the drawing image is in a drawing range within one-word width. The graphic-drawing processing unit 122 determines whether to switch to the arbitrary-word-width image drawing function unit 125 or to the one-word-width-limited image drawing function unit 126.

Figure 3:
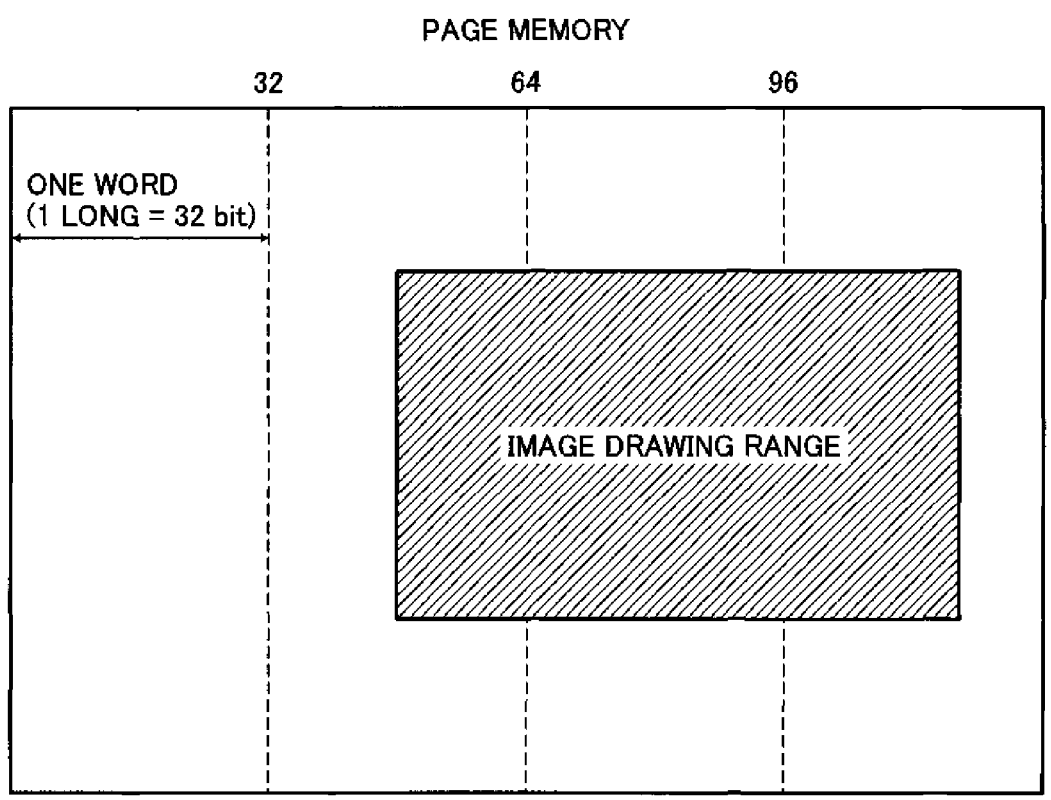
FIG. 3 is a schematic diagram for explaining a drawing range of an image in a page memory of an image-drawing destination, according to the first embodiment.

FIG. 3 is a schematic diagram for explaining a drawing range of an image in a page memory of an image-drawing destination, according to the first embodiment. If coordinates of the image-drawing destination is acquired, it is possible to immediately determine whether a drawing width is within one-word width, and to easily determine either the arbitrary-word-width image drawing function unit 125 or the one-word-width-limited image drawing function unit 126 needs to be used for accessing the page memory 123. In other words, as shown in FIG. 3, if there is an environment in which a one word is 32 bits (32 pixels), a determination can be performed based on whether an X-coordinate of the drawing range spans across 32 bits, 64 bits, or 96 bits.

Figure 4:
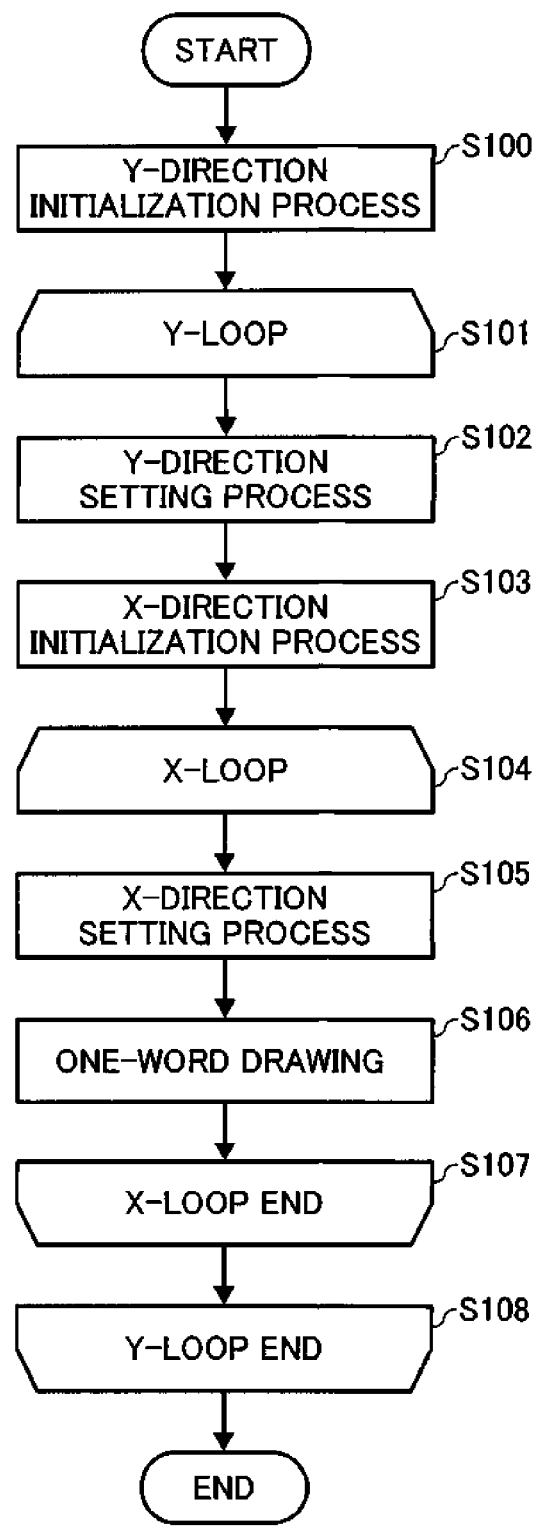
FIG. 4 is a flowchart of a processing performed by an arbitrary-word-width image drawing function unit shown in FIG. 2.
Figure 5:
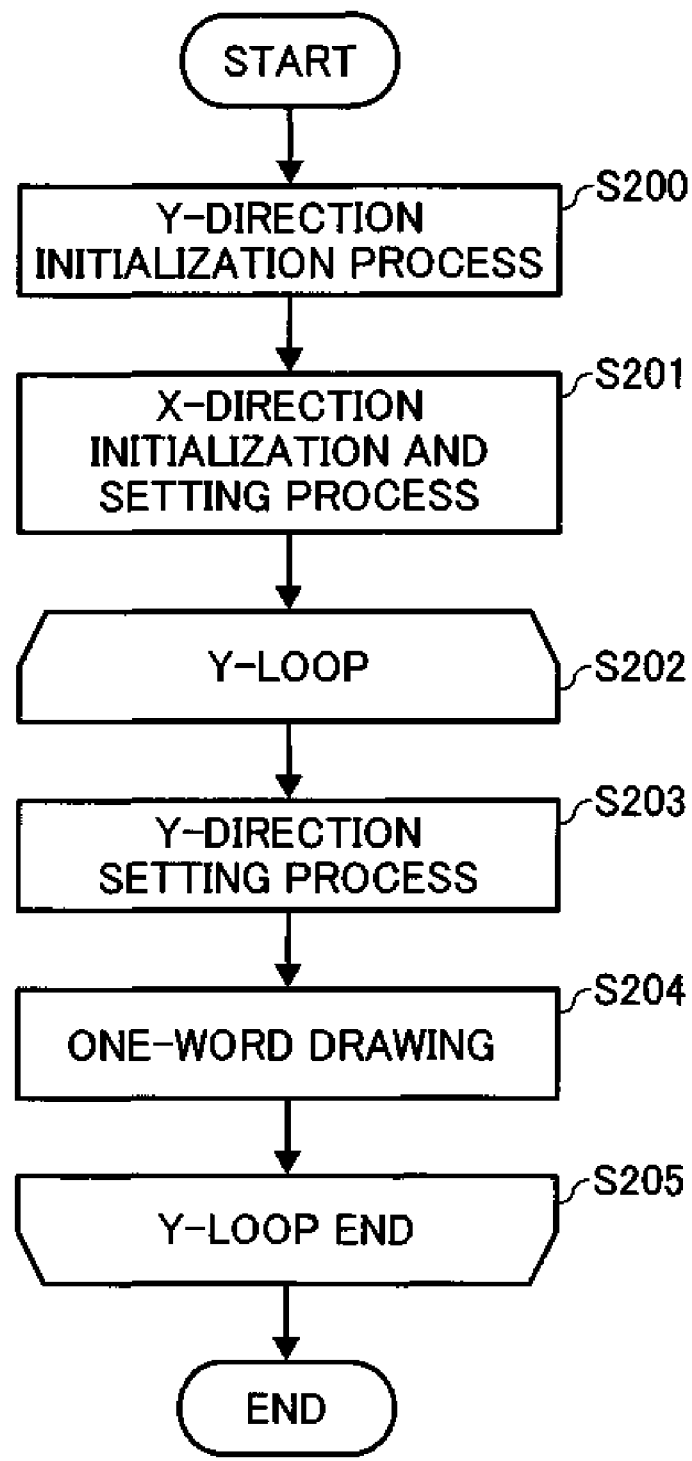
FIG. 5 is a flowchart of a processing performed by a one-word-width-limited image drawing function unit shown in FIG. 2.
Figure 6:
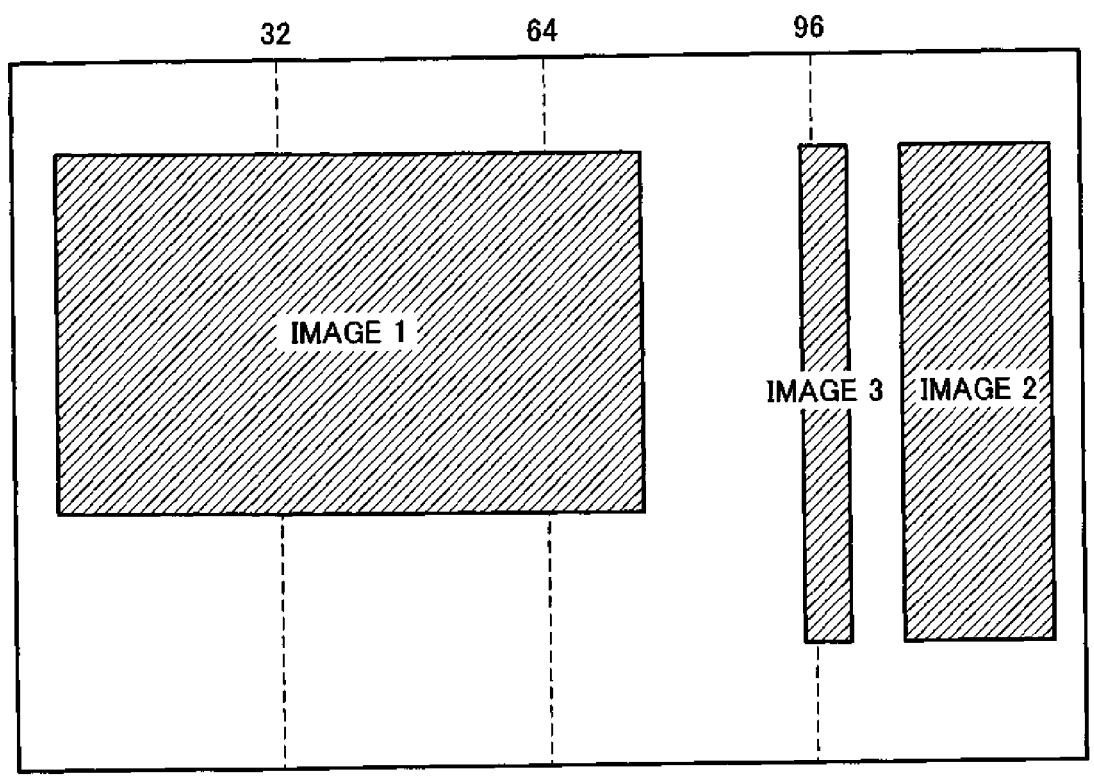
FIG. 6 is a schematic diagram for explaining various drawing ranges in a page memory, according to the first embodiment.

FIG. 4 is a flowchart of a processing performed by the arbitrary-word-width image drawing function unit 125. FIG. 5 is a flowchart of a processing performed by the one-word-width-limited image drawing function unit 126. FIG. 6 is a schematic diagram for explaining various drawing ranges in a page memory, according to the first embodiment. With the arbitrary-word-width image drawing function unit 125, a loop in a Y-direction (Y-loop) is performed as a large loop, while a loop in an X-direction (X-loop) is performed within the Y-loop, so that an access to the page memory 123 is performed for each one-word width.

In other words, with the arbitrary-word-width image drawing function unit 125, a Y-direction initialization process is performed (step S100), and the Y-loop is started (step S101). Thereafter, a Y-direction setting process is performed (step S 102), an X-direction initialization process is performed (step S103), the X-loop is started (step S 104), and an X-direction setting process is performed (step S105). In this manner, a drawing with one-word width is completed (step S106).

For a next word width (long), the Y-loop and the X-loop are repeated similarly to the above. Upon finishing the loops for a drawing range, the X-loop is terminated (step S107), and the Y-loop is subsequently terminated (step S108).

Details of the above processing performed by the arbitrary-word-width image drawing function unit 125 are explained below. A portion to be a drawing target is extracted from source image data and a dithering for one-word width is performed. Thereafter, a brush pattern of target-coordinates for the one-word width of the page memory 123 are acquired as appropriate and performs a raster operation (ROP) with the image data for the one-word width of the page memory 123. A mask process is performed for both lateral sides of the image drawing range, and a result of the mask process is written into the page memory 123. If there is a subsequent drawing range in the X-direction, same processing is performed for a next long.

If a size of a dither pattern is larger than the one-word width, a process for calculating or acquiring the dither pattern is necessary every time the one-word width is moved in the X-direction. The above processes are also necessary for a brush pattern in addition to the dither pattern.

A process is necessary for acquiring a dither pattern or a brush pattern for the Y-direction that is independent from the X-direction. For processes independently performed in the X-direction and in the Y-direction, a throughput increases in proportion to number of various types of functions such as a dither or a brush necessary for the one-word width and in proportion to a drawing range. Therefore, an access speed to a memory can be increased to sequential addresses with a function such as a memory burst, compared to a case for nonsequential addresses. In this manner, it is possible to improve drawing efficiency for an image with a width equal to or wider than a predetermined width.

On the other hand, with the one-word-width-limited image drawing function unit 126, as shown in FIG. 5, an initialization process in the Y-direction is performed (step S200), the Y-loop is started (step S202), and a setting process in the Y-direction is performed (step S203). The process for the Y-loop is the same as that explained with reference to FIG. 4. On the other hand, the X-direction initialization process and the X-direction setting process are exclusively necessary at step S201, and the X-loop is not necessary to be performed. Accordingly, after performing the Y-direction setting process at step S203, a drawing with one-word width is completed (step S204) and the Y-loop is terminated (step S205).

In other words, although a process for a dither pattern or a brush pattern for the Y-direction is same as those with the arbitrary-word-width image drawing function unit 125, a process in the X-direction can be simplified. Accordingly, number of commands for each one-word width can be reduced and a processing speed can be improved. As a result, it is advantageous that a probability for storing the image data on a CPU cache increases and a hit ratio can be raised. On the other hand, with the one-word-width-limited image drawing function unit 126, an image with a width equal to or wider than 2 longs cannot be drawn with a one-time function call.

As for a selection between the arbitrary-word-width image drawing function unit 125 and the one-word-width-limited image drawing function unit 126, in various drawing ranges of images shown in FIG. 6, because drawing widths of images 1 and 3 are not within one-word width, the arbitrary-word-width image drawing function unit 125 is used for drawing the images 1 and 3. On the other hand, because a drawing width of an image 2 is within one-word width, the one-word-width-limited image drawing function unit 126 is used for drawing the image 2.

As described above, according to the first embodiment, the graphic-drawing processing unit 122 determines whether a drawing range of an image to be drawn in a page memory is within one-word width, and selects either the arbitrary-word-width image drawing function unit 125 or the one-word-width-limited image drawing function unit 126 based on a determination. As a result, it is possible to improve drawing efficiency and to increase a speed of drawing an image.

A second embodiment of the present invention is constituted so that the one-word-width-limited image drawing function unit 126 is selected upon drawing an image with a drawing width equal to or wider than 2 longs, if there is an environment in which a processing speed can be faster by calling the one-word-width-limited image drawing function unit 126 twice than by using the arbitrary-word-width image drawing function unit 125.

Figure 7:
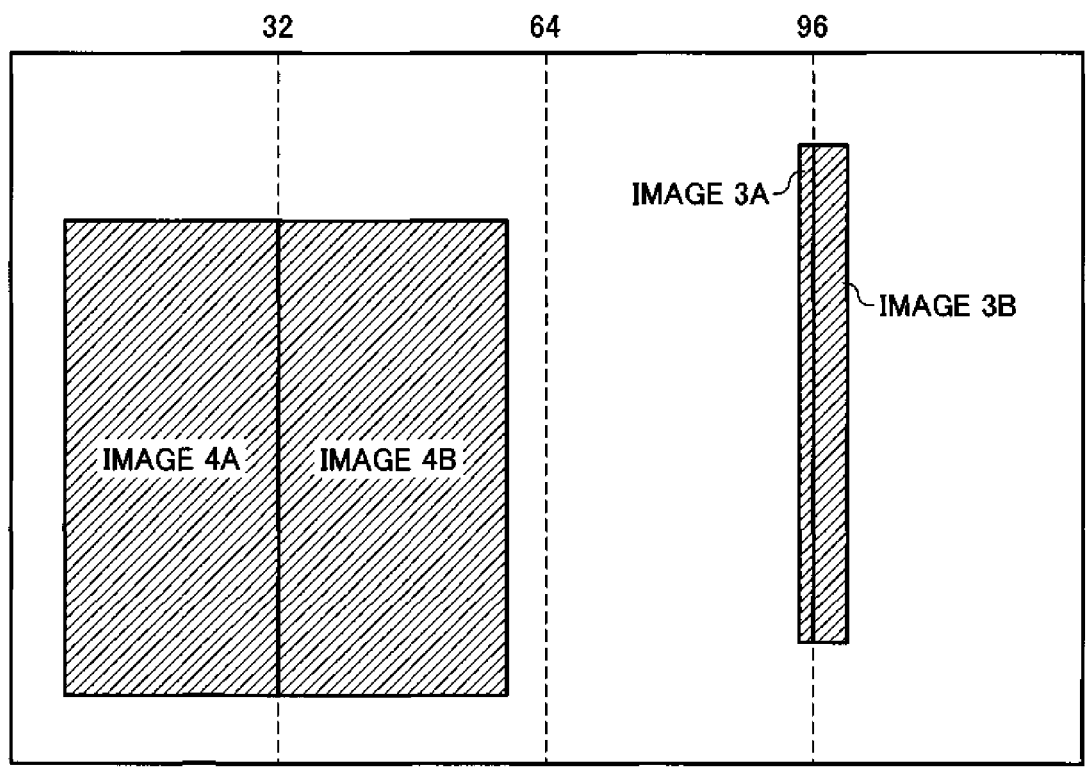
FIG. 7 is a schematic diagram for explaining a drawing range of an image where image data is previously separated into two pieces of image data at a word boundary, according to a second embodiment of the present invention.

FIG. 7 is a schematic diagram for explaining a drawing range of an image where image data is previously separated into two pieces of image data at a word boundary. As shown in FIG. 7, because each of images drawn in the page memory spans across word boundaries, each of the images are previously separated into two images in a longitudinal direction at each of the word boundaries of the page memory, so that images 3A, 3B, 4A, and 4B are created. For separating an image into two images at a word boundary, although it is easy to separate the image upon converting the image data into intermediate data by the interpreter executing unit 120, means for separating the image is not thus limited.

As described above, according to the second embodiment, even when an image has a drawing width that is wider than a one word (i.e., a combination of the images 4A and 4B), or even when an image having a drawing width equal to or wider than 2 pixels spans across two words (i.e., a combination of the images 3A and 3B), it is possible to increase a processing speed by calling the one-word-width-limited image drawing function unit 126 twice by the graphic-drawing processing unit 122, compared to a case using the arbitrary-word-width image drawing function unit 125.

Although the image having a drawing range that spans across two words is explained in the second embodiment, if a processing can be performed faster by repeatedly calling the one-word-width-limited image drawing function unit 126 than by using the arbitrary-word-width image drawing function unit 125, the one-word-width-limited image drawing function unit 126 can be similarly used for an image having a drawing range that spans across three or more words.

Although an image drawing is explained as an example according to the first and the second embodiments, the present invention is not thus limited and can be applied to a rectangular drawing. The rectangular drawing employs a drawing range similarly to that of the image drawing, and therefore, explanation thereof is omitted. Thus, a speed of a drawing process can be increased upon performing the rectangular drawing, similarly to a case for the image drawing.

Figure 8:
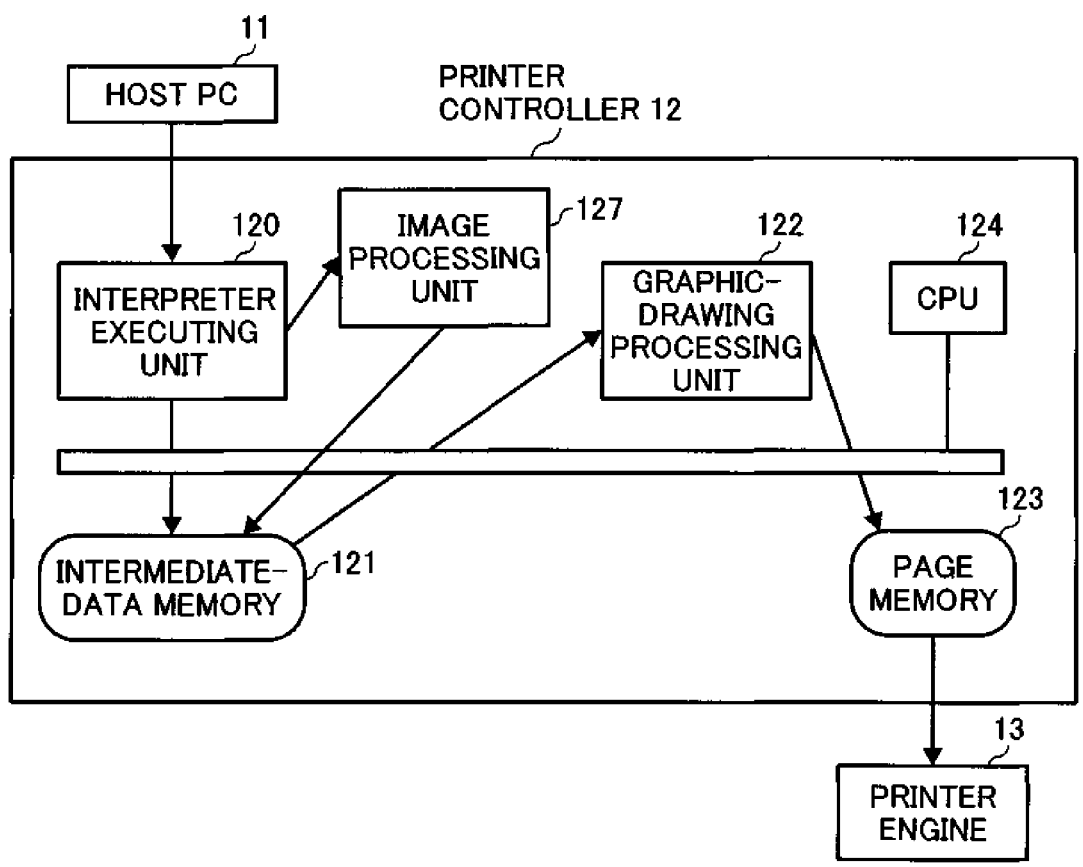
FIG. 8 is a block diagram of a printer controller according to a third embodiment of the present invention.
Figure 9:
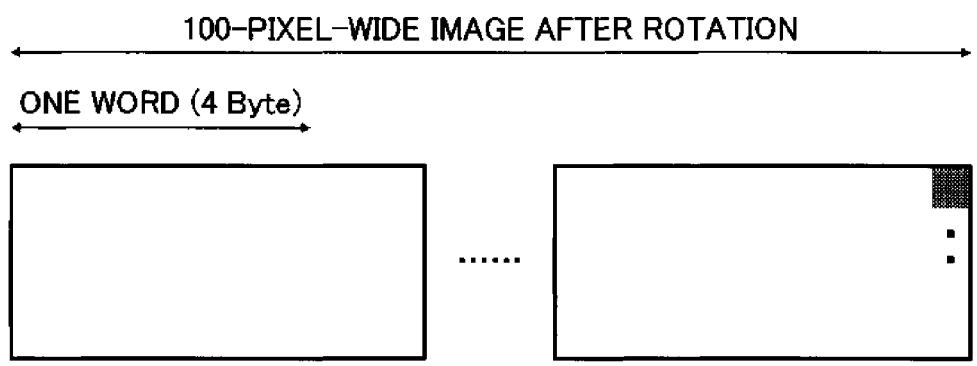
FIG. 9 is a schematic diagram for explaining an occurrence of an access jump on a memory upon reading a landscape image and outputting pixel after rotating the landscape image by 90 degrees, according to the third embodiment.
Figure 10:
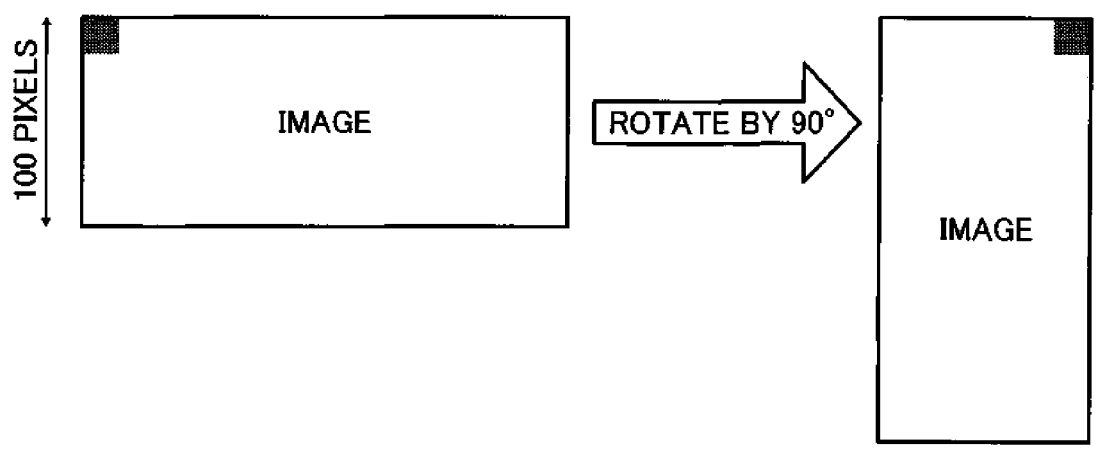
FIG. 10 is a schematic diagram for explaining an image with a thin width after rotating the image by 90 degrees, according to the third embodiment.
Figure 11:
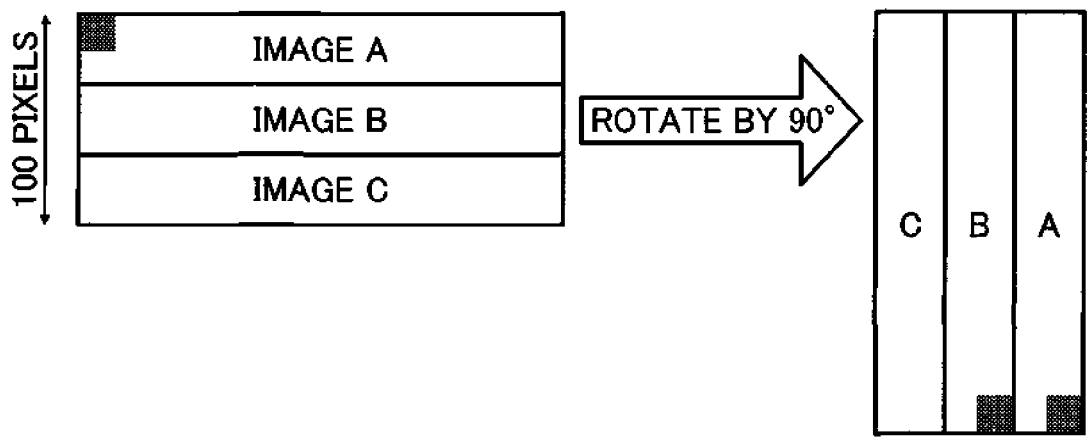
FIG. 11 is a schematic diagram for explaining a landscape image separated into lines so that an image width becomes thin, of a portrait-oriented image obtained after rotating the landscape image by 90 degrees, according to the third embodiment.

FIG. 8 is a block diagram of the printer controller 12 according to a third embodiment of the present invention. FIG. 9 is a schematic diagram for explaining an occurrence of an access jump on a memory upon reading a landscape image and outputting pixel after rotating the landscape image by 90 degrees. FIG. 10 is a schematic diagram for explaining an image with a thin width after rotating the image by 90 degrees. FIG. 11 is a schematic diagram for explaining a landscape image separated into lines so that an image width becomes thin of a portrait-oriented image obtained after rotating the landscape image by 90 degrees.

As shown in FIG. 8, the printer controller 12 according to the third embodiment is constituted so that the printer controller 12 includes an image processing unit 127 that performs a rotation process or a separation process for an image, when the interpreter executing unit 120 interprets and executes print data (image data) sent from the host PC 11.

Upon interpreting and executing the image data by the interpreter executing unit 120, an image is possibly separated into a plurality of images depending on an available memory usage. In this case, most of images are separated into lines so that images with wide lengths and short heights are sequentially aligned. For rotating a page by 90 degrees with the printer controller 12, the image processing unit 127 performs a rotation process for a landscape image.

As shown in FIG. 9, if an image before being rotated by 90 degrees is landscape and the image is read from an upper left to an upper right in a lateral direction, the image after being rotated becomes a portrait oriented, and therefore, a pixel is drawn from an upper right toward a lower right. In this manner, a drawing of a pixel toward a lower end of the image causes an occurrence of an access jump on a memory by an image width on the memory after rotating the image, and therefore, a load on the memory access increases. In addition, cache overflow in a CPU easily occurs, the image data exceeds a burst length, and therefore, an access speed decreases.

As shown in FIG. 10, if an image width after rotating the image is sufficiently narrow, an access jump on a memory by the image width occurred for every 1 pixel upon writing out can be small, so that the image data can possibly be stored in the CPU cache even if the image rotated is an elongated image with a long height. Even when the image data cannot be stored in the CPU cache, because number of the pixels, which is to be written out using the image data within a range of a burst length of a memory burst function included in a number of hardware, can be increased, and a time for drawing an image after a rotation can be shortened if the image width after the rotation becomes thinner.

As shown in FIG. 11, upon rotating an elongated landscape image by 90 degrees or 270 degrees, if the interpreter executing unit 120 detects that the image height is within a specific range, the image is separated into lines before a rotation to create each of separated images A to C with short heights. The specific range is, for example, between 33 pixels and 128 pixels.

A reason why a maximum value of the image height is set is because it is possible to increase a drawing speed of an image when a width of the image is wider upon drawing the image having a same area. In other words, because a processing speed of a rotation process can be increased with a narrow width, while a processing speed of a drawing process can be increased with a wide width, it is necessary to strike a balance between the processing speeds.

For an image that satisfies the above condition, it is determined whether the image spans across a word boundary of the page memory 123 using coordinates of an image-drawing destination. If the image spans across the word boundary of the page memory 123, it is determined across which line the image spans. In other words, because a word is a minimum unit for a memory access performed by hardware, it is possible to improve efficiency by performing a drawing process using the above unit. For example, in an environment in which a one word is determined to be 4 bytes (that is, 32 bits), if there is a drawing condition of 1-bit depth, an X-coordinate corresponding to multiples of 32 is determined to be the word boundary (see FIG. 3).

Figure 12:
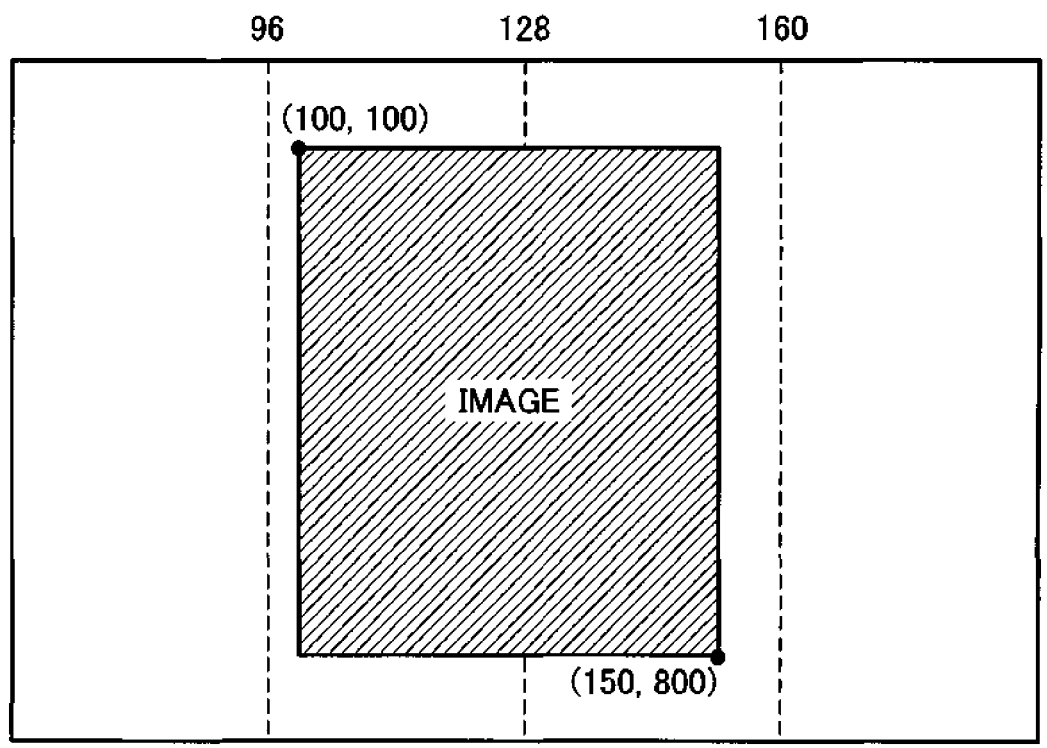
FIG. 12 is a schematic diagram for explaining an image drawn in a page memory after the image is rotated by 90 degrees, according to the third embodiment.
Figure 13:
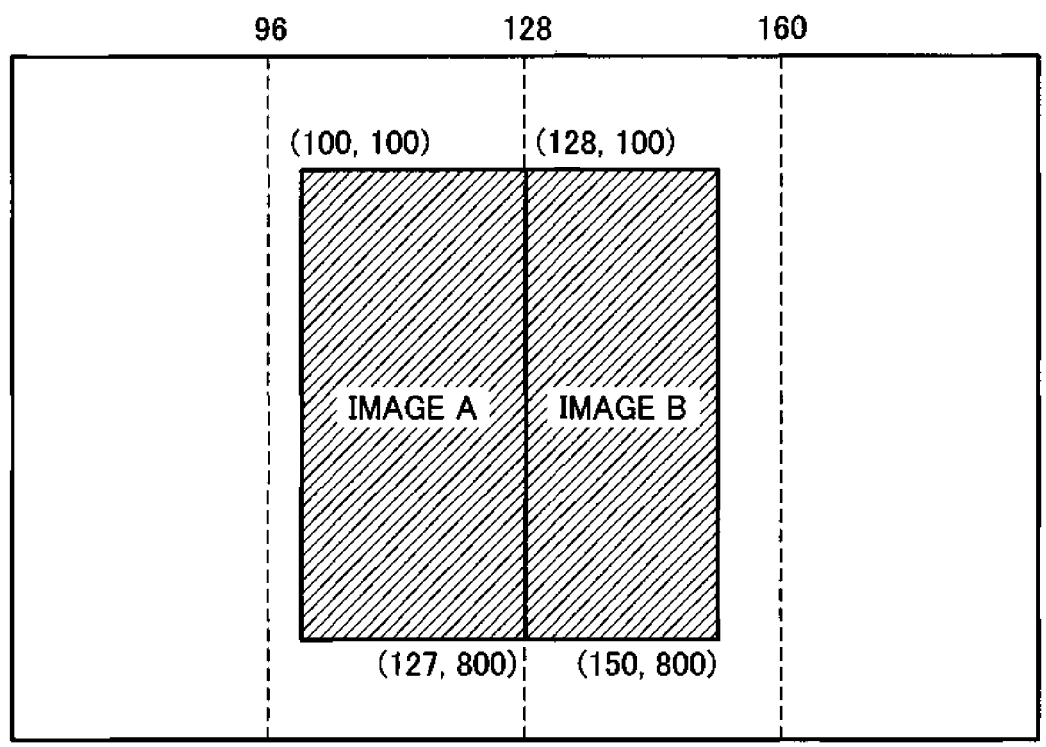
FIG. 13 is a schematic diagram for explaining images A and B obtained by separating the image shown in FIG. 12 at an X-coordinate of 128.
Figure 14:
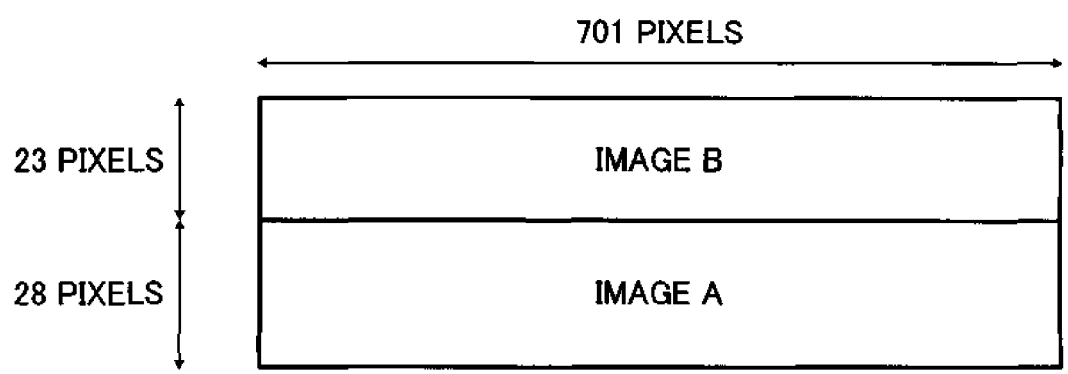
FIG. 14 is a schematic diagram for explaining an image width of an image before being rotated to the image shown in FIG. 13.
Figure 15:
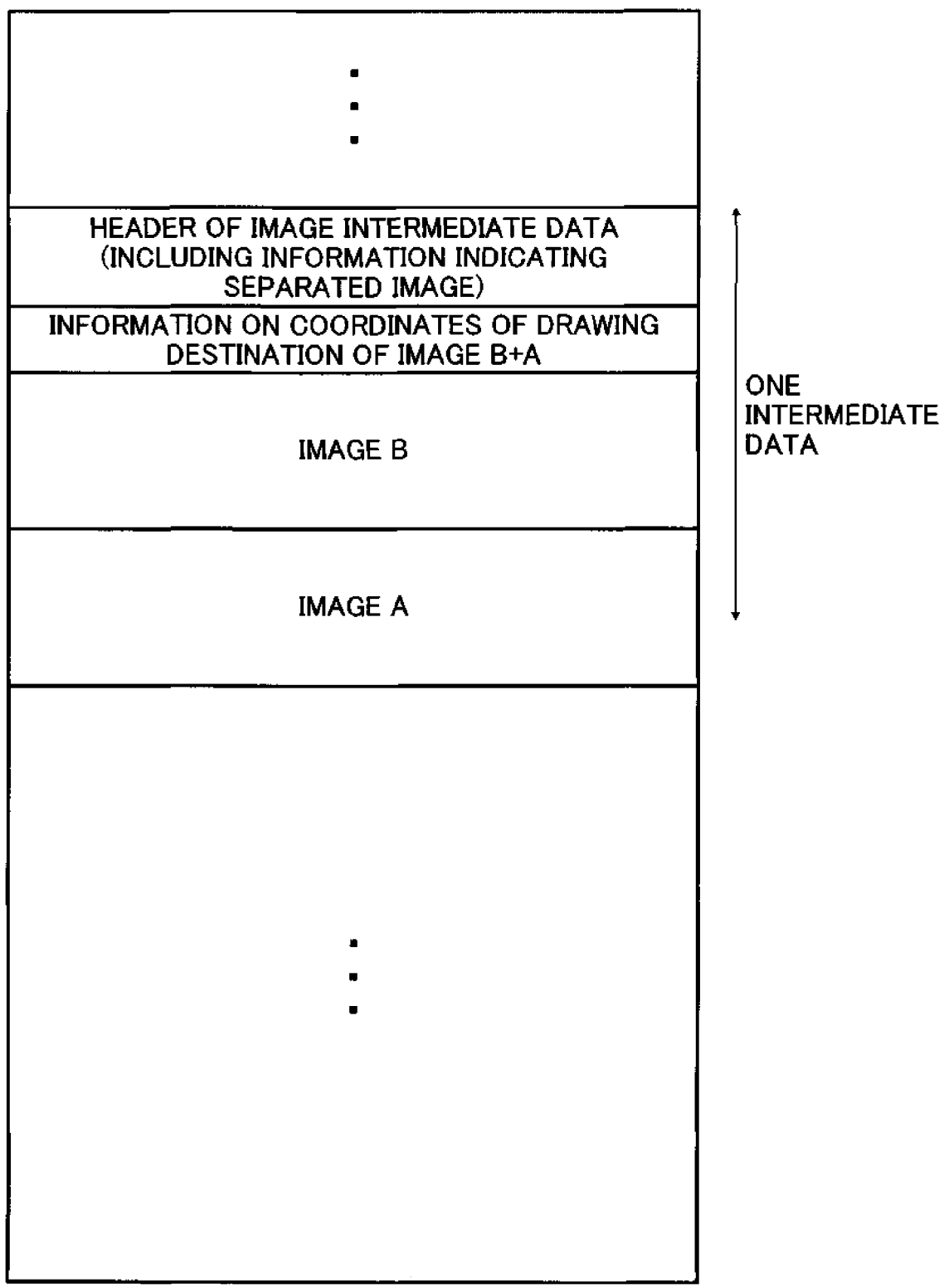
FIG. 15 is an example of a data structure in an intermediate-data memory, upon rotating the image shown in FIG. 14 by 90 degrees and upon converting the same image into intermediate data.
Figure 16:
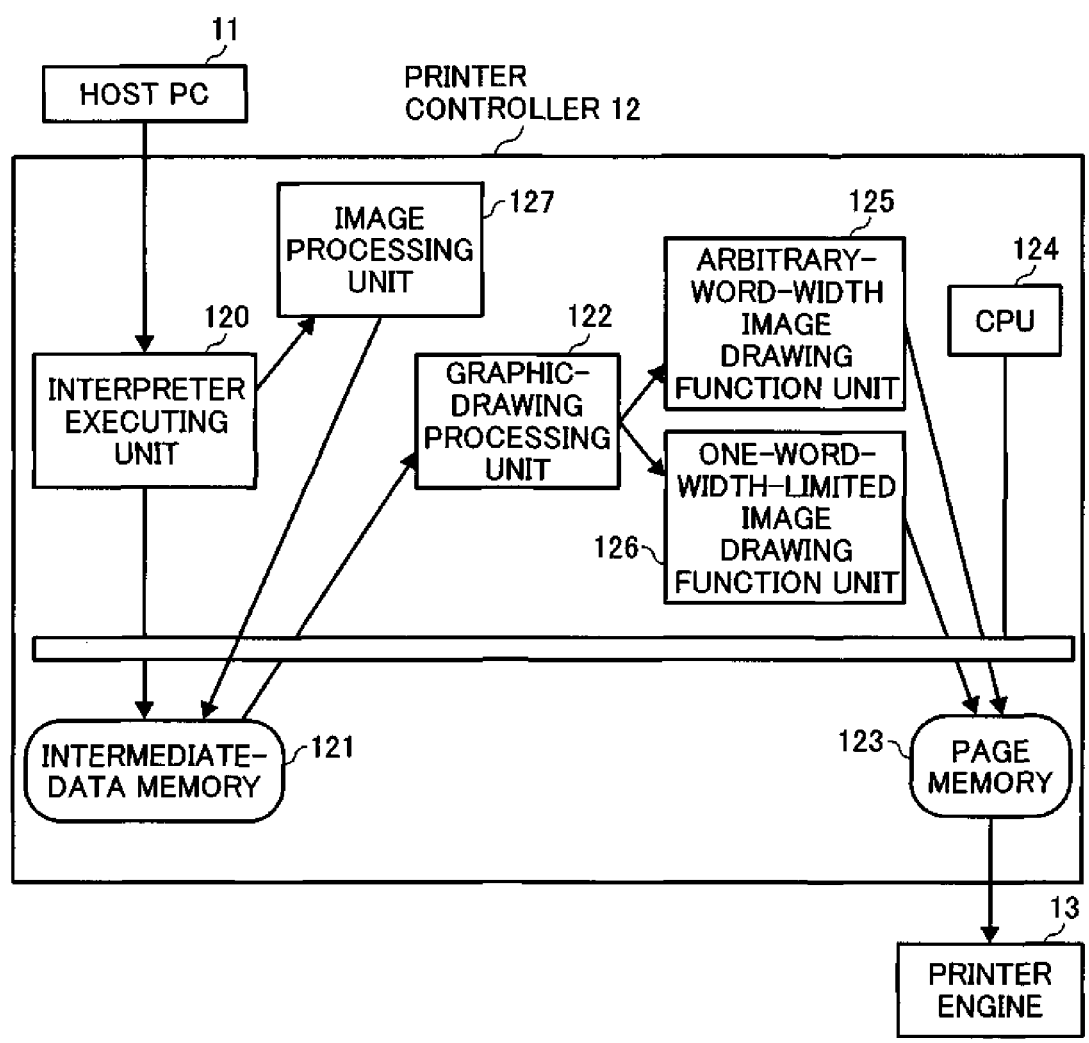
FIG. 16 is a block diagram of the printer controller that further includes an arbitrary-word-width image drawing function unit and one-word width-limited image drawing function unit, according to the third embodiment.

FIG. 12 is a schematic diagram for explaining an image drawn in a page memory after the image is rotated by 90 degrees. FIG. 13 is a schematic diagram for explaining images A and B obtained by separating the image shown in FIG. 12 at an X-coordinate of 128. FIG. 14 is a schematic diagram for explaining an image width of the image before being rotated to the image shown in FIG. 13. FIG. 15 is an example of a data structure in an intermediate-data memory upon rotating the image shown in FIG. 14 by 90 degrees and upon converting the same image into the intermediate data. FIG. 16 is a block diagram of the printer controller 12 according to the third embodiment that further includes the arbitrary-word-width image drawing function unit 125 and the one-word-width-limited image drawing function unit 126.

As shown in FIG. 12, in an example of an image drawing after rotating the image by 90 degrees, if the image is drawn in an image drawing range represented by (100, 100)-(150, 800) on coordinates at a same magnification, the image drawing range includes the word boundary of an X-coordinate of 128. In this case, the image before being rotated has a size with a width of 701 pixels and a height of 51 pixels (see FIG. 14).

As shown in FIG. 13, if the image is separated at the word boundary of the X-coordinate of 128 on a drawing destination, an image A having a size with a height of 701 pixels and a width of 28 pixels is drawn on the coordinates represented by (100, 100)-(127, 800), and an image B having a size with a height of 701 pixels and a width of 23 pixels is drawn on the coordinates represented by (128, 100)-(150, 800).

As described above, with the image processing unit 127 that rotates an image and converts the image into the intermediate data, it is possible to easily perform the separation process and the rotation process at the same time, by separately reading out the image twice and specifying a writing out as an image width after a separation.

The intermediate data shown in FIG. 15 is constituted of a header of image intermediate data that includes information on a separated image, information on coordinates of a drawing destination of a combination of the images A and B, data of the image B, and information on the image A. A piece of the intermediate data is created for a single image drawing command interpreted by the interpreter executing unit 120, and stores therein the separated images A and B.

Upon interpreting the intermediate data by the graphic-drawing processing unit 122, the header of the intermediate data includes information indicating that a plurality of the separated images are included, as shown in FIG. 15. When the graphic-drawing processing unit 122 performs the drawing process to the page memory 123, because the images A and B have same drawing conditions other than the coordinates and the contents of the images, various settings can be shared. In this case, if there is an image drawing function that draws an image in units of word, the one-word-width-limited image drawing function unit 126 is primarily used. If there is not the image drawing function that draws an image in units of word, the arbitrary-word-width image drawing function unit 125 is used for performing the drawing process.

For an image that is rotated by 90 degrees, because drawing coordinates of the image is subsequently stored in the page memory 123 from an upper right as shown in FIG. 11, the coordinates of the drawing destination before separating the image is drawn from an upper right in a downward direction to the word boundary, and then next image is drawn from a subsequent portion to a next word boundary, so that the image drawing is continuously performed until the drawing range is finished.

Figure 17:
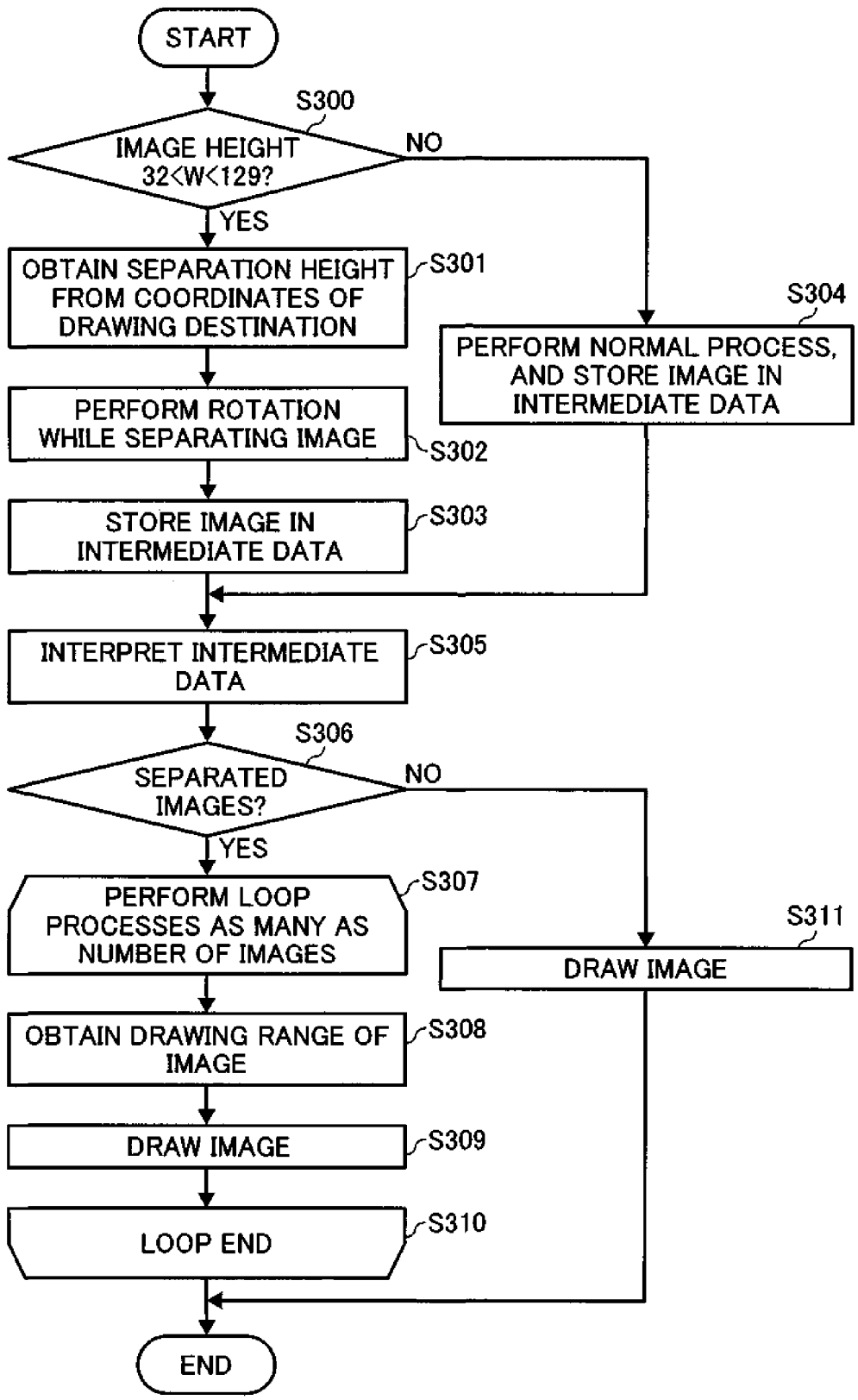
FIG. 17 is a flowchart of an operation performed by the printer controller according to the third embodiment.

An operation for a processing according to the third embodiment is explained with reference to FIG. 17. At step S300, if a height of an image is in a range between 33 pixels and 128 pixels (YES at step S300), a separation height at which the image is separated is obtained from the coordinates of a drawing destination (step S301). Thereafter, the image processing unit 127 simultaneously performs a separation process and a rotation process (step S302), and the image is stored in the intermediate-data memory 121 (step S303).

If the height of the image is not in a range between 33 pixels and 128 pixels (NO at step S300), a normal process is performed in which the rotation process is performed without performing the separation process, and the image is stored as the intermediate data in the intermediate-data memory 121 (step S304).

The graphic-drawing processing unit 122 reads the intermediate data from the intermediate-data memory 121 and interprets the intermediate data (step S305), and then it is determined that whether there are separated images (step S306). If there are separated images (YES at step S306), loop processes are performed as many as the number of the separated images (step S307). In the loop process, a drawing range of the image is obtained (step S308), and a image drawing for the drawing range is performed (step S309). If the loop processes are repeated as many as the number of the images, the loop processes terminate (step S310).

If there are not separated images (NO at step S306), a drawing process is performed for the read image (step S311).

As described above, according to the third embodiment, upon creating the intermediate data for an image drawing command interpreted by the interpreter executing unit 120, if an image height is within a specific range, the image is separated and rotated for performing a drawing process for each of the separated images. As a result, it is possible to strike a balance between the rotation process and the drawing process and at the same time it is possible to increase a speed of the above processes.

Figure 18:
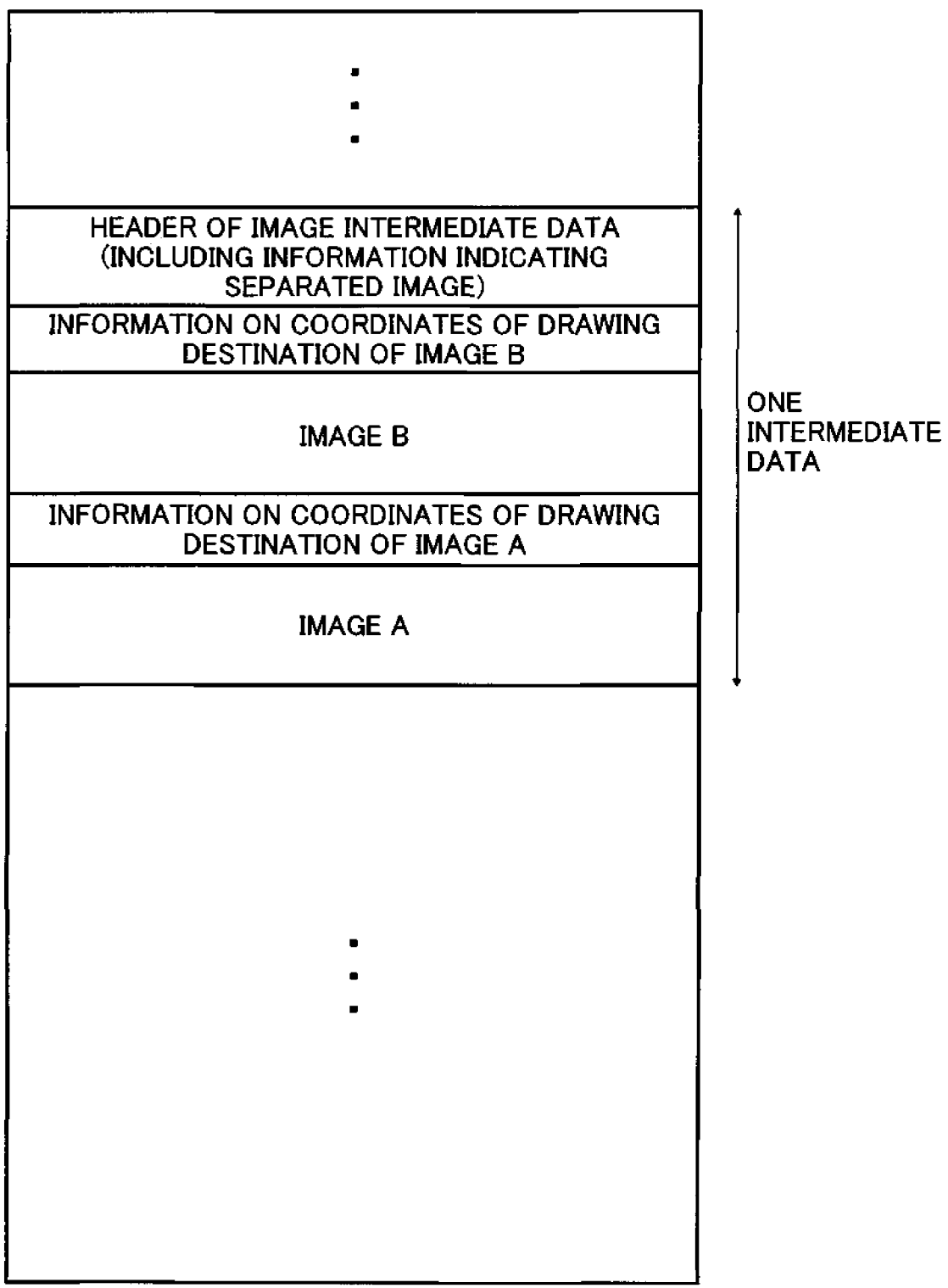
FIG. 18 is an example of a data structure in an intermediate-data memory according to a fourth embodiment of the present invention.

FIG. 18 is an example of a data structure in an intermediate-data memory according to a fourth embodiment of the present invention. As shown in FIG. 18, the fourth embodiment is constituted so that the image processing unit 127 creates a piece of intermediate data, in which information about coordinates of a drawing destination is respectively added to the separated images, upon separating the image.

As described above, according to the fourth embodiment, number of the access jump on the memory can be decreased compared to a case in the third embodiment, and therefore, it is possible to reduce a load on the memory access and to increase a processing speed.

Figure 19:
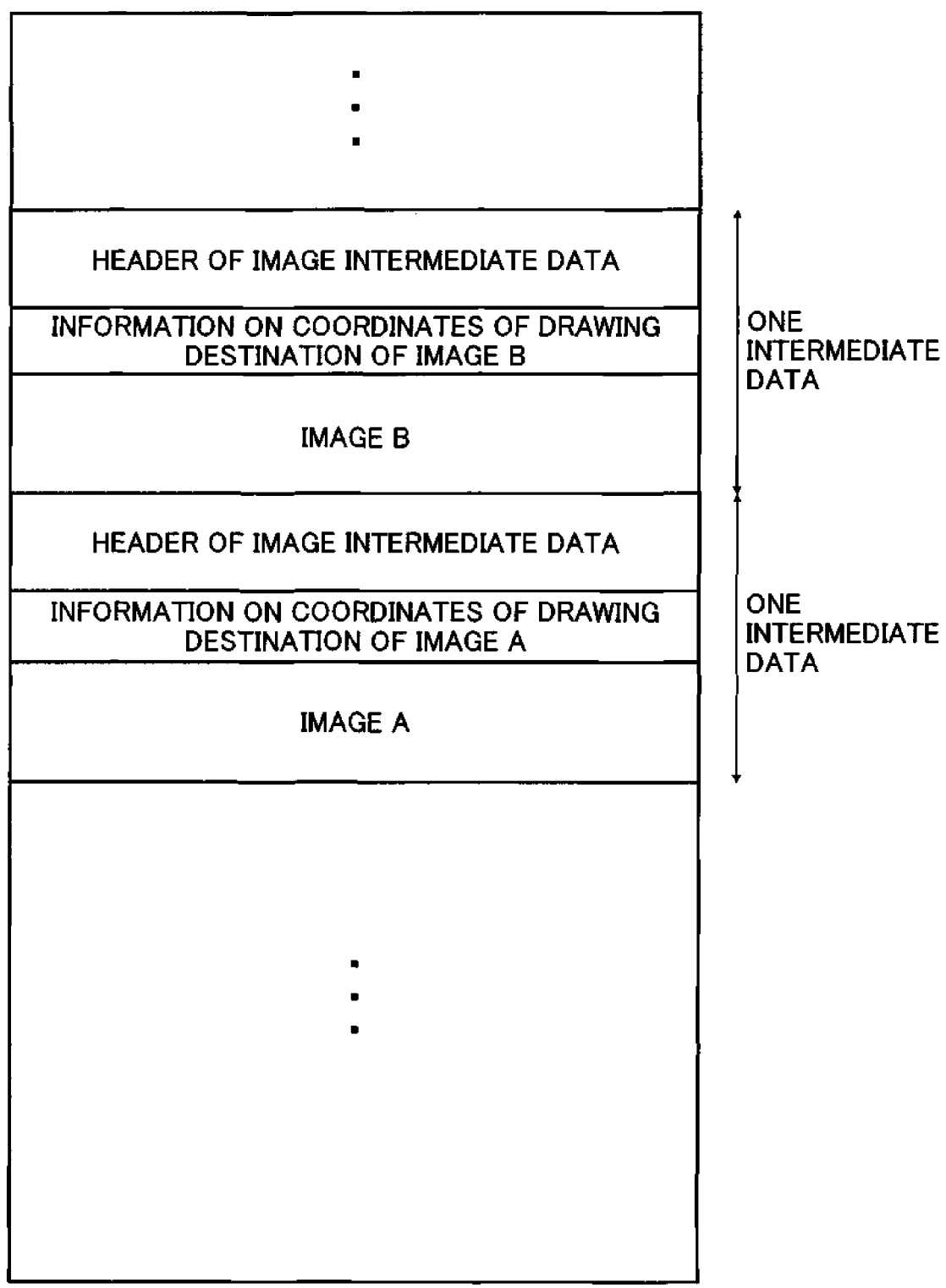
FIG. 19 is a schematic diagram of an example of a data structure in an intermediate-data memory according to a fifth embodiment of the present invention.

FIG. 19 is an example of a data structure in an intermediate-data memory according to a fifth embodiment of the present invention. As shown in FIG. 19, the fifth embodiment is constituted so that the image processing unit 127 creates a plurality of pieces of the intermediate data for all the separated images. In other words, pieces of the intermediate data correspond to pieces of the image data one by one.

As described above, according to the fifth embodiment, number of the access jump on the memory can be further decreased compared to a case in the fourth embodiment. Therefore, it is possible to reduce a load on the memory access and to increase a processing speed.

Figure 20:
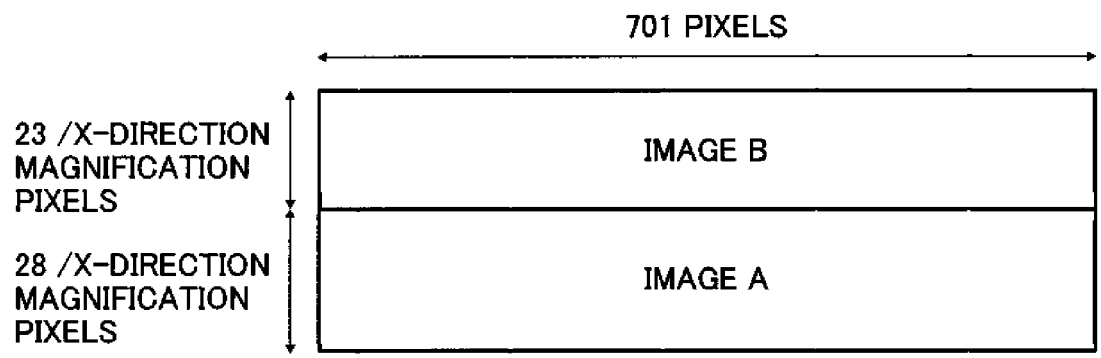
FIG. 20 is a schematic diagram for explaining an image separation upon selecting a drawing of an enlargement image, according to a sixth embodiment of the present invention.

FIG. 20 is a schematic diagram for explaining an image separation upon selecting a drawing of an enlargement image, according to a sixth embodiment of the present invention. As for an image for which a drawing of the enlargement image is selected, it is necessary to adjust a word boundary of the drawing destination to the image data, based on an enlargement rule for a drawing. More specifically, a width of a drawing destination image separated at the word boundary of the drawing destination is divided by an magnification, and obtained value is used as a height for separating an image before being rotated. In other words, unlike a drawing at a same magnification (see FIG. 14), a height is obtained by dividing each of the widths of the images by the magnification in the X-direction applied for a drawing.

As described above, according to the sixth embodiment, even when the drawing of the enlargement image is selected, because the separation process for an image is performed based on the word boundary of the drawing destination that has been enlarged, it is possible to increase a speed of a drawing process of image data, similarly to a case for a drawing at a same magnification.

Figure 21:
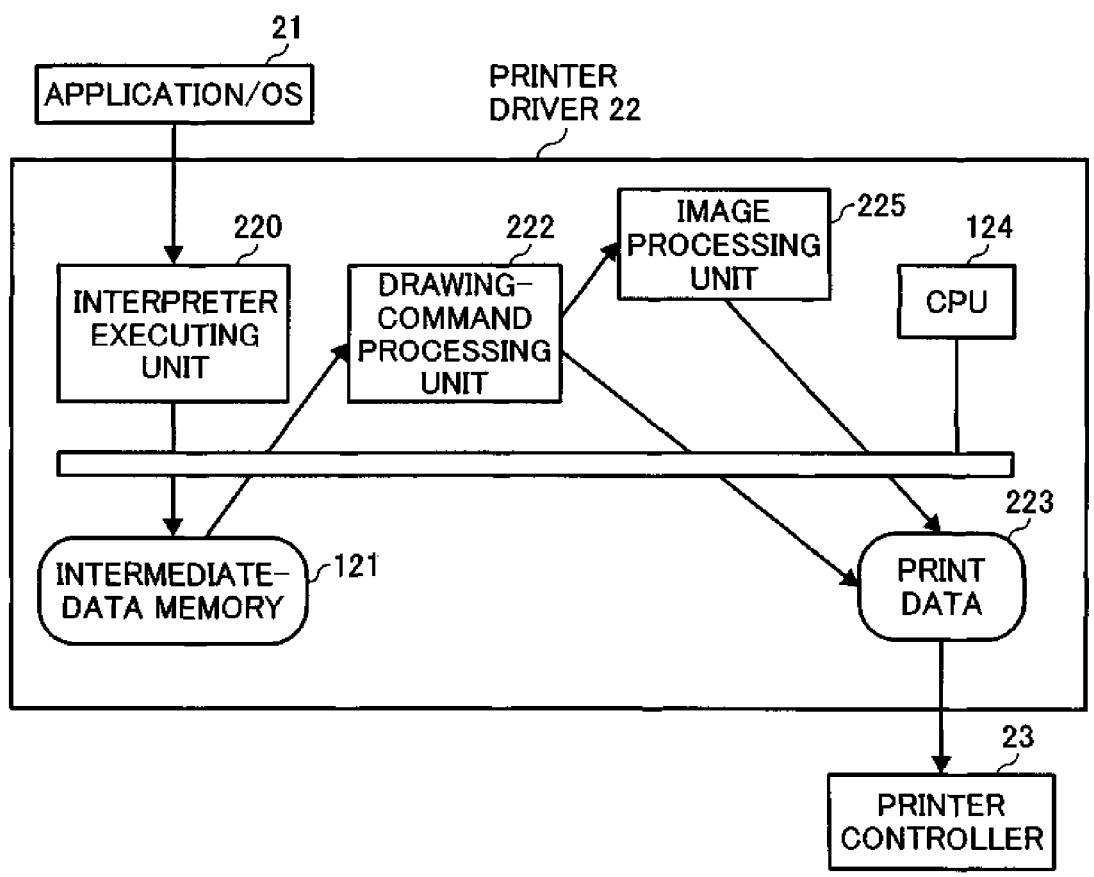
FIG. 21 is a block diagram of a printer driver according to a seventh embodiment of the present invention.
Figure 22:
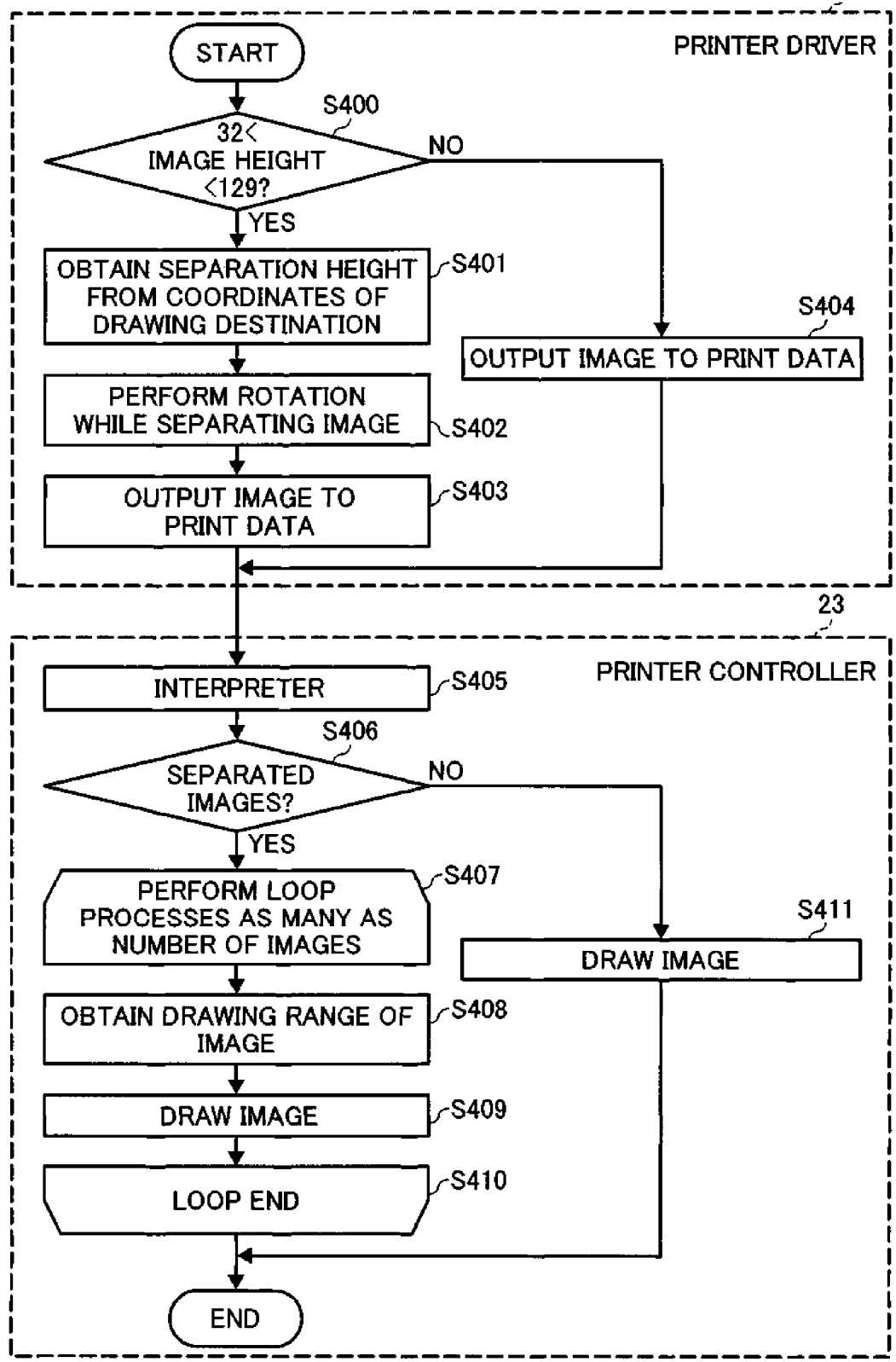
FIG. 22 is a flowchart of an operation performed by the printer controller shown in FIG. 21.

FIG. 21 is a block diagram of a printer driver 22 according to a seventh embodiment of the present invention. FIG. 22 is a flowchart of an operation performed by the printer driver 22 and a printer controller 23. A print data processing system according to the seventh embodiment is constituted of the printer driver 22 in a host PC (not shown) that creates print data, and the printer controller 23. An image drawing command input to the printer driver 22 is created by an application operating system (OS) 21 in the host PC, and a rotation process for the image is performed by an image processing unit 225 in the printer driver 22.

According to the seventh embodiment, it is constituted so that an image drawing command processed by a drawing-command processing unit 222 via the image processing unit 225 is output as print data 223.

If the printer controller 23 is exclusively applicable for a format including one image data, the image drawing command to be output to the print data 223 is separated by the image processing unit 225.

An operation performed in the seventh embodiment is explained with reference to a flowchart shown in FIG. 22. The printer driver 22 determines whether an image height is within a range between 33 pixels and 128 pixels, based on the image drawing command input by the application OS 21 (step S400). If the image height is within a range between 33 pixels and 128 pixels (YES at step S400), the separation height is obtained based on coordinates of the drawing destination (step S401), a separation process and a rotation process are simultaneously performed by the image processing unit 225 (step S402), and the image is output to the print data 223 (step S403).

If the image height is out of a range between 33 pixels and 128 pixels (NO at step S400), the image is output to the print data 223 without performing the separation process (step S404). The above processes are performed by the printer driver 22.

Thereafter, an interpreter executing unit (see the interpreter executing unit 120 shown in FIG. 1) in the printer controller 23 interprets and executes the print data (step S405). In this case, the graphic-drawing processing unit (see the graphic-drawing processing unit 122 shown in FIG. 1) determines whether there are separated images (step S406). If there are separated images (YES at step S406), loop processes are performed as many as the number of the separated images (step S407). In the loop process, a drawing range of the image is obtained (step S408), and an image drawing for the drawing range is performed (step S409). After repeating the above processes for all the separated images, the loop processes terminate (step S410).

If there are not separated images (NO at step S406), the drawing process is performed to the read image (step S411).

As described above, according to the seventh embodiment, when the image processing unit 225 processes the image drawing command interpreted by the interpreter executing unit 120 in the printer driver 22, if the image height is within a specific range, the image is separated and rotated so that the image is output as the print data to the printer controller 23. In the printer controller 23, a drawing process is performed for each of the separated images, and therefore, it is possible to strike a balance between the rotation process and the drawing process and to increase a processing speed.

Figure 23:
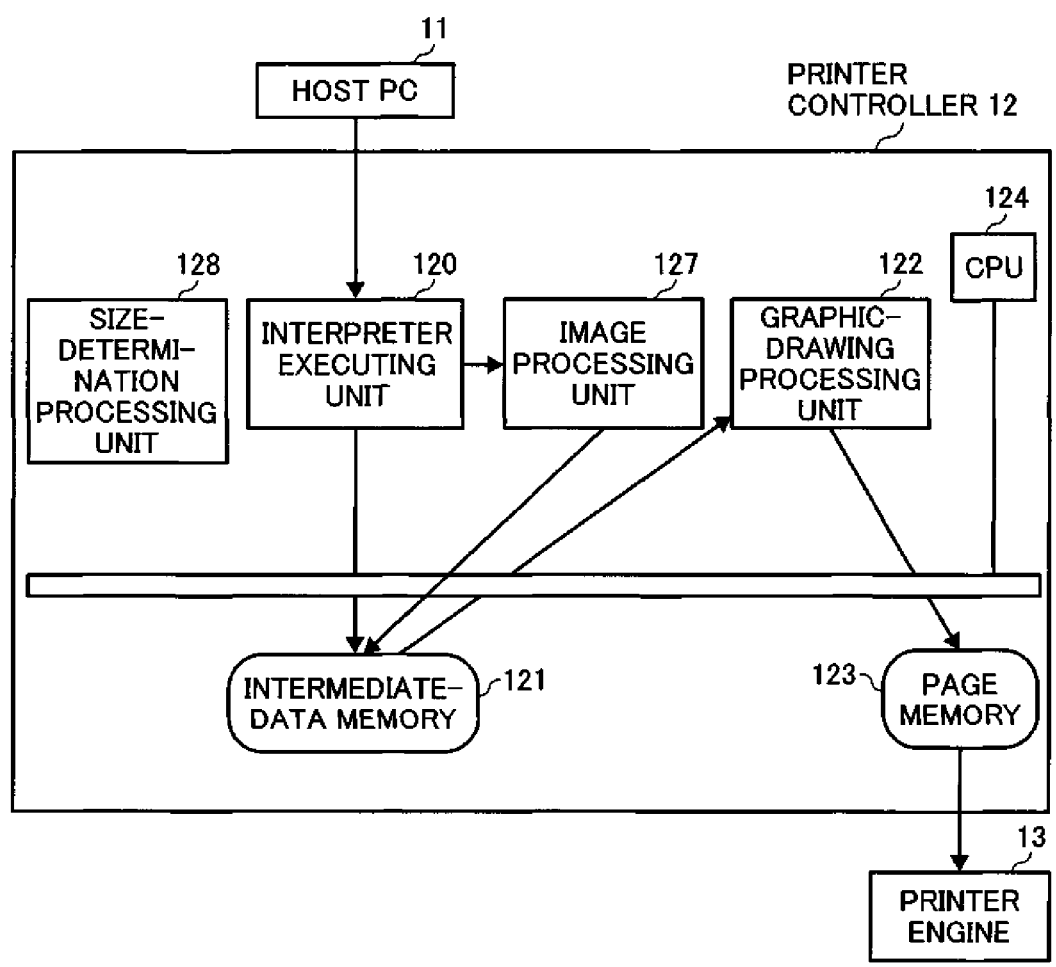
FIG. 23 is a block diagram of a printer controller according to an eighth embodiment of the present invention.
Figure 25:
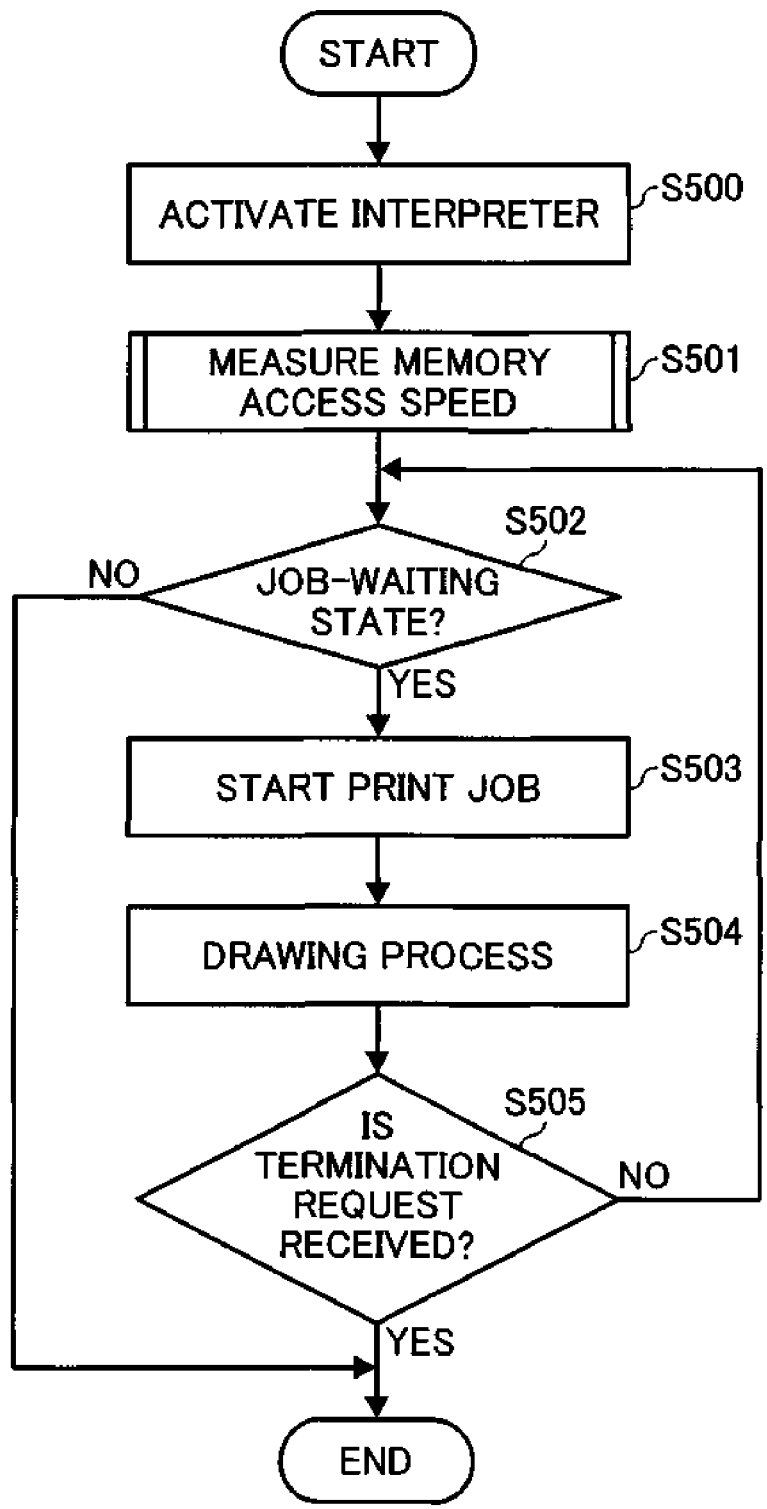
FIG. 25 is a flowchart of an operation performed by the printer controller shown in FIG. 23.
Figure 26:
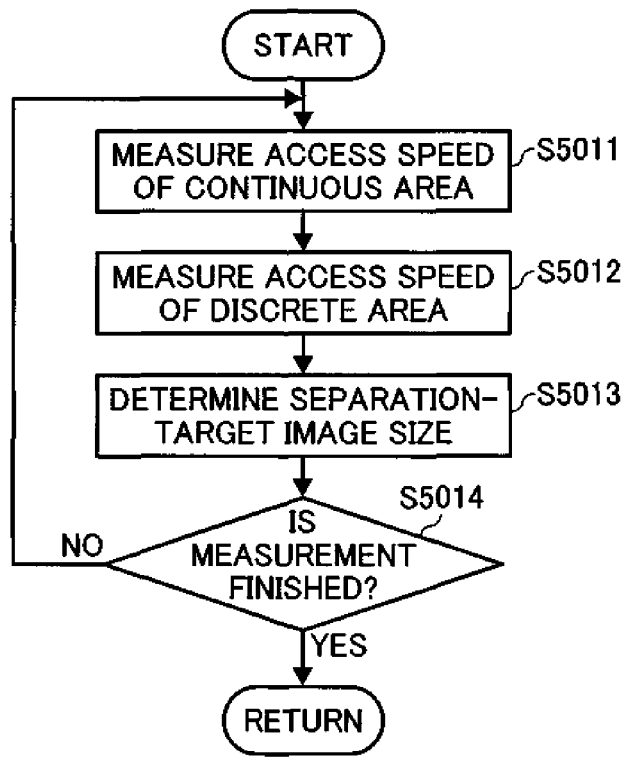
FIG. 26 is a flowchart of a sub routine at step S501 shown in FIG. 25.

FIG. 23 is a block diagram of the printer controller 12 according to an eighth embodiment of the present invention. FIG. 25 is a flowchart of an operation performed by the printer controller 12 according to the eighth embodiment. FIG. 26 is a flowchart of a sub routine at step S501 shown in FIG. 25.

As shown in FIG. 23, when the interpreter executing unit 120 interprets and executes print data (image data) sent from the host PC 11, if the image processing unit 127 separates an image and performs a rotation process of separated images, it is also necessary to perform a drawing to each of the separated images. Even when a drawing is performed, a drawing speed increases if the image has an area that is elongated to be longer than a predetermined length in a lateral direction. Therefore, not all images with various size are necessary to be separated. On the other hand, upon rotating the image before performing the dithering, because memory traffic increases by the rotation process compared to the drawing process, it is desirable to perform the rotation process after performing the separation process.

The printer controller 12 according to the eighth embodiment is constituted to previously determine whether the rotation process is to be performed after the separation process, based on a shape of the image (a size determination for a width and a height of the image). A threshold is determined using a memory access speed in an execution environment, for the width and the height of the image (image shape) to be in a shape elongated in a longitudinal direction after rotating the image.

A size-determination processing unit 128 shown in FIG. 23 measures a read/write time (Ts1) for sequential 128 bytes and a time (Td1) obtained by performing the read/write 128 times for each 1 byte at an interval of 128 bytes. If the size-determination processing unit 128 cannot perform a measurement at a one time, the measurement is repeated plural times. If the measured Ts1 and Td1 are not different at this state, a processing speed is not increased by performing the image separation under the above environment. In addition, for 64 bytes or 96 bytes, the measurement is similarly performed.

When a printing is started and page information is set, resolution depth that indicates bits per pixel can be obtained. Therefore, by dividing an access time for the above sequential area by 8 and by multiplying a division result by the resolution depth obtained, a time factor for a drawing process (Ts2) can be obtained. At the same time, by dividing an access time for a discrete area by 8 and multiplying a division result by the resolution depth obtained, a time factor (Td2) can be obtained.

As described above, in each of cases using 64 bytes, 96 bytes, and 128 bytes, images before and after an image that satisfies the following equation is targeted to increase a processing speed by the image separation.

$$(Ts1+Td2)>(Td1+Ts2) \tag{1}$$

An operation performed in the eighth embodiment is explained with reference to FIGS. 25 and 26. As shown in FIG. 25, after activating the interpreter executing unit 120 (step S500), a measurement process of a memory access speed is performed (step S501).

The measurement process of the memory access speed is performed as shown in FIG. 26, in which a measurement of an access speed to a continuous memory area is performed (step S5011), a measurement is performed of an access speed to a discrete memory area that exceeds a burst length under the same execution environment (step S5012), and a separation-target image size is determined based on the above equation (1) (step S5013).

If there is a need to measure other access speeds, that is, the measurement is not finished (NO at step S5014), the process returns to step S5011 and the above measurement processes are repeated. If there is not a need to measure the other access speeds, that is, the measurement is finished (YES at step S5014), and when it is determined that an image corresponds to the above determined image size by the interpreter executing unit 120, an image separation and a rotation process are performed and the image is stored in the intermediate-data memory 121.

At step S502, if it is determined to be in a print-job waiting state, the process proceeds to step S503, and a print job is started. When the print job is started, the graphic-drawing processing unit 122 reads out print data as a group of the drawing commands stored in the intermediate-data memory 121, and pastes the print data on the page memory so that the drawing process is performed (step S504).

At step S505, if a termination request is not received, the process returns to step S502 so that the above drawing process is repeated. If the termination request is received or the job waiting state is terminated, the process terminates.

As described above, according to the eighth embodiment, a shape of the image data (a size determination in a width and a height of the image) according to the environment is obtained in advance of the drawing process, and if the image corresponds to an obtained image data size, the image separation and the rotation process are performed. On the other hand, if the image does not correspond to the obtained image data size, the drawing process is performed without separating the image. As a result, it is possible to increase a processing speed depending on the environment.

Figure 24:
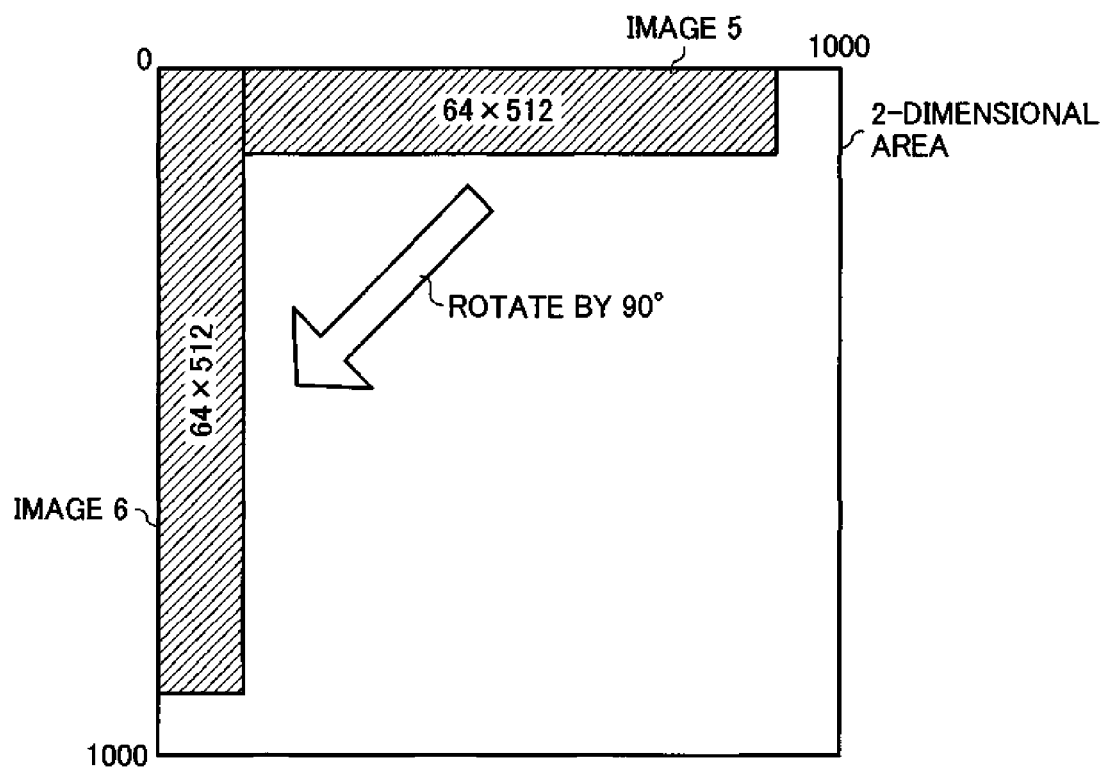
FIG. 24 is a schematic diagram for explaining a measurement of a rotation processing time in which an image area with a width of 64 and a height of 512 in a two-dimensional area is rotated by 90 degrees and a rotation processing time in which the image area is rotated after performing the separation process, according to a ninth embodiment of the present invention.

FIG. 24 is a schematic diagram for explaining a measurement of a rotation processing time in which an image area with a width of 64 and a height of 512 in a two-dimensional area is rotated by 90 degrees and a rotation processing time in which the image area is rotated after performing the separation process, according to a ninth embodiment of the present invention.

The printer controller 12 according to the ninth embodiment is constituted so that the interpreter executing unit 120 performs a determination process in the following manner, upon activating the interpreter executing unit 120. A rotation processing speed is actually measured in which an area of an image 5, which has a width and a height represented by 64×512, 96×512, and 128×512 in a two-dimensional area represented by 1000×1000 shown in FIG. 24, is rotated by 90 degrees for a printing (an image 6). In addition, another rotation processing speed is actually measured in which the image is rotated after performing the separation process. Thereafter, the above measured speeds are compared with each other.

The above size determining process uses a parameter of an execution environment, and if an image size is around a size that has a width and a height with which a process can be performed at a maximum speed, a processing speed can be maximized by performing a rotation process without performing a separation process. If the image size with which a processing speed can be maximized is obtained by separating the image, a rotation process can be performed at a maximum speed after separating the image to the above size.

Alternatively, another size determining process determines an image size based on a parameter that depends on a print page or print data. For example, if page information of a printing is set, a resolution depth that indicates bits per pixel is determined. Accordingly, a target image size varies, with which a rotation speed is increased. In this manner, an image size with which a processing speed can be increased is determined using a parameter that depends on the print page or the print data.

As described above, the size determining process is performed in a case in which a determination is performed using a parameter of the execution environment and a case in which a determination is performed using a parameter that depends on the print page or the print data. Each of the above size determination processes separately affects to the image size, so that each of the determination processes is independently performed.

Although an example is explained in which a speed is actually measured upon rotating an image by 90 degrees for a printing according to the ninth embodiment, the present invention is not thus limited and it is possible to rotate the image by 270 degrees.

Furthermore, it is possible to perform the size determination process using a parameter of the execution environment in activating an apparatus at first time, so that a determination result is used upon activating the apparatus after a second time. Accordingly, it is possible to omit the size determination process to be performed every time when the apparatus is activated. Therefore, a processing speed can be increased.

Moreover, upon performing the size determination process using the parameter that depends on the print data, it is possible to perform the process at minimum number of times, i.e., at a start of a page or at a start of a job. Accordingly, it is possible to omit the size determination process performed for every page or for every job. Therefore, a processing speed can be increased.

As described above, the size determination process is performed in which a processing speed is actually measured upon rotating an image area having a plurality of widths and heights in a two-dimensional area represented by 1000×1000 for a printing, and a processing speed is also actually measured in which the image is separated and then rotated for a printing. Thereafter, the measured speeds are compared so that a image with the width and the height with which the process has performed at a maximum speed is determined to be a target for increasing a processing speed. As a result, it is possible to increase a processing speed depending on an environment.

The printer controller 12 according to a tenth embodiment is constituted so that, when a creation environment and an operation environment of the interpreter are the same, a measurement of a memory access speed according to the ninth embodiment is performed at a timing of creating the interpreter, and the interpreter is created so that a measurement value is input in the interpreter as a constant number. In other words, the size determination process is performed either by using the parameter of the execution environment or by using the parameter that depends on the print page or the print data, because each of the size determination processes separately affects the image size so that each of the determination processes is performed by a different processing unit. In a constitution of the printer controller 12 shown in FIG. 23, the size-determination processing unit 128 includes independent determining units.

Figure 27:
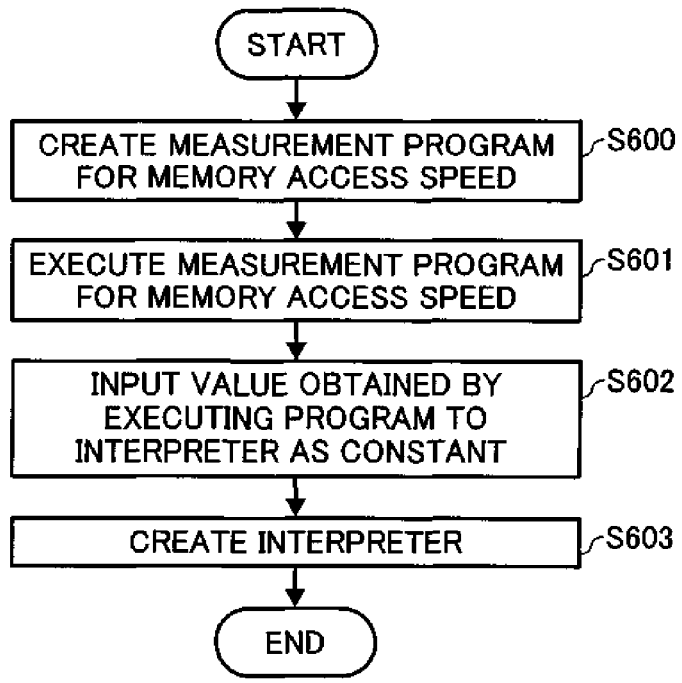
FIG. 27 is a flowchart of an operation performed by a printer controller according to a tenth embodiment of the present invention.

FIG. 27 is a flowchart of an operation performed by the printer controller 12 according to the tenth embodiment. When an interpreter creating program is started, the size-determination processing unit 128 creates a measurement program of a memory access speed before creating the interpreter (step S600).

By executing each of the independent determining units in the size-determination processing unit 128 using the measurement program (step S601), an image size to increase a processing speed and the image size is input in the interpreter (step S602). In this manner, the interpreter (program) is created (step S603).

As described above, according to the tenth embodiment, a memory access speed corresponding to the image size is measured upon creating the interpreter, and an obtained result is input in the interpreter as a constant number of the interpreter. Accordingly, it is possible to omit the size determination process or a measurement of the memory access speed to be subsequently performed and a processing speed can be increased.

The printer controller 12 according to an eleventh embodiment of the present invention is constituted so that an image size to be separated is determined using a processing time of an existing function used for other purposes, other than using a specific determination processing time such as a measurement process of the memory access speed as explained in the eighth embodiment.

For example, according to the eleventh embodiment, it is possible to alternate the above measurement with another measurement using the processing times that have initially other purposes, such as a processing time of performing a drawing process using a dither pattern or a processing time of a function for performing a zero clear to a specific area.

As described above, according to the eleventh embodiment, upon performing the determination process for an image size by using a parameter, it is not necessary to use a specific determination processing time, and the processing time of performing a drawing process using the dither pattern or the processing time of the function for performing a zero-clear operation to a specific area can be alternatively used, so that the image size to be target to a separation can be determined. As a result, it is possible to shorten a processing time and to increase an operation speed.

According to an embodiment of the present invention, the print-data processing apparatus includes the graphic-drawing processing unit that performs a rendering process of print data to a band memory or a page memory. The graphic-drawing processing unit performs the rendering process in an environment in which a rendering engine that performs a memory access using a memory word width as a minimum unit is used, and includes an arbitrary-word-width drawing unit that accesses to an arbitrary word with having an arbitrary height and one-word width-limited drawing unit that exclusively accesses one-word width having an arbitrary height. The graphic-drawing processing unit performs a drawing process by switching the arbitrary-word-width drawing unit and the one-word-width-limited drawing unit. Accordingly, it is possible to improve a processing efficiency by performing an memory access in units of memory word length. The graphic-drawing processing includes an arbitrary-word-width drawing unit that accesses an arbitrary-word-width having an arbitrary height and one-word width-limited drawing unit that exclusively accesses one-word width having an arbitrary height, which are selectively used. The graphic-drawing processing also determines whether to switch the above units. Therefore, it is possible to perform a drawing process by selecting either the arbitrary-word-width drawing unit or the one-word-width-limited drawing unit based not only on the word width but on a processing speed.

Furthermore, according to an embodiment of the present invention, the graphic-drawing processing unit performs the rendering process of print data to the band memory or to the page memory. An image processing unit performs the rotation process or the separation process of the image data. Upon performing the rotation process, the image processing unit separates the image data into a plurality of pieces of the image data and then performs the rotation process. Upon rotating an image, because the image processing unit separates the image data into a plurality of pieces of the image data and then performs the rotation process, it is possible to strike a balance between a rotation processing speed and a drawing processing speed for increasing a processing speed.

Moreover, according to an embodiment of the present invention, the size-determination processing unit determines whether a size of the image data corresponds to a size of image data acquired based on an environment, before the graphic-drawing processing unit performs the rendering process. If the size of the image data corresponds to the size of the image data acquired, the image processing unit separates the image data into a plurality of pieces of the image data and then performs the rotation process. Therefore, it is possible to increase an processing speed depending on an environment.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for processing print data, comprising:
a graphic-drawing processing unit that performs a rendering process of print data with respect to either one of a band memory and a page memory;
an image processing unit that performs at least one of a rotation process for rotating image data and a separation process for separating the image data into to a plurality of images; and
a size-determination processing unit that determines whether the separation process is to be performed, based on a measured access time for accessing a memory area of a size corresponding to a height and a width of the image data, wherein
when the size-determination processing unit determines that the separation process is to be performed before the graphic-drawing processing unit performs the rendering process, the image processing unit performs the separation process to separate the image data into a plurality of images and performs the rotation process, and
when the size-determination processing unit determines that the separation process is not to be performed, the image processing unit performs the rotation process without performing the separation process, and
wherein the size-determination processing unit determines a first read-write time for performing a read-write operation for a specific number of sequential bytes, and a second read-write time for performing the read-write operation with a single byte the specific number of times, and
the size-determination processing unit determines that the separation process is to be performed, if the first read-write time is greater than the second read-write time and
the size-determination processing unit determines that the separation process is not to be performed, if the first read-write time equals the second read-write time.

2. The apparatus according to claim 1, wherein the size-determination processing unit separately performs at least a process of determining a first parameter that depends on an environment and a process of determining a second parameter that depends on a print page and print data.

3. The apparatus according to claim 2, wherein the first parameter is determined using at least a rotation time for rotating a plurality of portrait-oriented images either by 90 degrees or 270 degrees and a drawing time for drawing a portrait-oriented image on a virtual page memory.

4. The apparatus according to claim 2, wherein the first parameter is determined using at least an access speed to a continuous memory area and an access speed to a discrete memory area that exceeds a burst length in the environment.

5. The apparatus according to claim 1, wherein the size-determination processing unit performs a measuring process including:
(a) measuring a first access time for accessing a continuous memory area corresponding to the width and the height of the image data; and
(b) measuring a second access time for accessing a plurality of discrete memory areas corresponding to the width and height of the image data.

6. The apparatus according to claim 1, wherein the size-determination processing unit performs a measuring process including:
(a) measuring a first rotation processing time for rotating data that has not been processed by the separation process, based on the width and the height of the image data; and
(b) measuring a second rotation processing time for rotating data that has been processed by the separation process, based on the width and height of the image data.

7. An apparatus for processing print data, comprising:
a graphic-drawing processing unit that performs a rendering process of print data with respect to either one of a band memory and a page memory;
an image processing unit that performs at least one of a rotation process for rotating image data and a separation process for separating the image data into to a plurality of images; and
a size-determination processing unit that determines whether the separation process is to be performed, based on a measured access time for accessing a memory area of a size corresponding to a height and a width of the image data, wherein
when the size-determination processing unit determines that the separation process is to be performed before the graphic-drawin processing unit performs the rendering process, the image processing unit performs the separation process to separate the image data into a plurality of images and performs the rotation process, and when the size-determination processing unit determines that the separation process is not to be performed, the image processing unit performs the rotation process without performing the separation process, wherein the size-determination processing unit performs a measuring process including:
(a) measuring a first access time for accessing a continuous memory area corresponding to the width and the height of the image data; and
(b) measuring a second access time for accessing a plurality of discrete memory areas corresponding to the width and height of the image data, wherein the size-determination processing unit determines that the separation process is to be performed, if the first access time is greater than the second access time, and the size-determination processing unit determines that the separation process is not to be performed, if the first access time equals the second access time.

8. An apparatus for processing print data, comprising:
a graphic-thawing processing unit that performs a rendering process of print data with respect to either one of a band memory and a page memory;
an image processing unit that performs at least one of a rotation process for rotating image data and a separation process for separating the image data into to a plurality of images; and
a size-determination processing unit that determines whether the separation process is to be performed, based on a measured access time for accessing a memory area of a size corresponding to a height and a width of the image data, wherein when the size-determination processing unit determines that the separation process is to be performed before the graphic-thawing processing unit performs the rendering process, the image processing unit performs the separation process to separate the image data into a plurality of images and performs the rotation process, and when the size-determination processing unit determines that the separation process is not to be performed, the image processing unit performs the rotation process without performing the separation process, wherein the size-determination processing unit performs a measuring process including:
(a) measuring a first rotation processing time for rotating data that has not been processed by the separation process, based on the width and the height of the image data; and
(b) measuring a second rotation processing time for rotating data that has been processed by the separation process, based on the width and height of the image data, and wherein the size-determination processing unit determines that the separation process is to be performed, if the first rotation processing time is greater than the second rotation processing time, and the size-determination processing unit determines that the separation process is not to be performed, if the first rotation processing time equals the second rotation processing time.

* * * * *